United States Patent [19]

Fry et al.

[11] 4,403,286
[45] Sep. 6, 1983

[54] BALANCING DATA-PROCESSING WORK LOADS

[75] Inventors: Scott M. Fry; Harry O. Hempy, both of Tucson, Ariz.; Bruce E. Kittinger, Fort Collins, Colo.

[73] Assignee: International Business Machines Corporation, Armonk, N.Y.

[21] Appl. No.: 241,175

[22] Filed: Mar. 6, 1981

[51] Int. Cl.³ .................. G06F 15/16; G06F 15/20
[52] U.S. Cl. .................................................. 364/200
[58] Field of Search ............................. 364/200, 900

[56] References Cited

U.S. PATENT DOCUMENTS

| | | | |
|---|---|---|---|
| 3,377,619 | 4/1968 | Marsh et al. | 364/200 |
| 3,588,837 | 12/1968 | Rash et al. | 364/200 |
| 3,602,900 | 8/1971 | Delaigue et al. | 364/200 |
| 3,643,227 | 2/1972 | Smith et al. | 364/200 |
| 3,999,163 | 12/1976 | Levy et al. | 364/200 |
| 4,032,899 | 1/1977 | Jenny | 364/200 |
| 4,040,026 | 8/1977 | Gernelle | 364/200 |
| 4,050,095 | 9/1977 | Pettipher et al. | 364/200 |
| 4,080,649 | 3/1978 | Calle et al. | 364/200 |
| 4,096,571 | 6/1978 | Vander Mey | 364/200 |
| 4,099,235 | 7/1978 | Höschler et al. | 364/200 |
| 4,183,083 | 1/1980 | Chatfield | 364/200 |

OTHER PUBLICATIONS

IBM Technical Disclosure, 10/72, pp. 1523-1525, Fennell, Jr., "Queue System For a Two Program, Pipelined Instruction Unit".
IBM Technical Disclosure, 8/77, pp. 937-938, Baker et al., "Load Balancing Control for Multiprocessors".
IBM Technical Disclosure, 4/71, pp. 3458-3459, J. Aikes et al., "I/O Channel Device Load Balancing Algorithm".

*Primary Examiner*—Charles E. Atkinson
*Assistant Examiner*—Jameson Lee
*Attorney, Agent, or Firm*—Herbert F. Somermeyer

[57] ABSTRACT

Data processing workloads are balanced between a plurality of data processing units, such as control units of a peripheral system, based upon tallies of data processing delays. The workloads are arranged in work allocations, such as assignment of peripheral devices to a control unit; a separate delay tally is kept for each work allocation along with a summation of all delays in each control unit. When a tally threshold in any data processing unit is exceeded, load balance is examined. Upon a predetermined imbalance, a work allocation having a delay tally equal to a mean value of the different delay summations is transferred to a data processing unit having a lower delay summation.

23 Claims, 25 Drawing Figures

BALANCING DATA-PROCESSING WORK LOADS

DOCUMENTS INCORPORATED BY REFERENCE

U.S. Pat. No. 3,688,274 shows a channel command retry (CCR).

U.S. Pat. No. 3,400,371 shows a central processor, input/output channel, and a peripheral subsystem.

Reference to Co-filed Commonly Assigned Patent Application

C. A. Milligan, et al., Ser. No. 241,274, filed Mar. 6, 1981, entitled "Buffered Peripheral Subsystem".

FIELD OF THE INVENTION

The present invention relates to multi-unit data processing systems, particularly to balancing workloads between various units within one system. While the invention is particularly useful for loosely-coupled data-processing systems, the principles of the invention can be applied to tightly-coupled systems, symmetrical systems, master-slave systems, and the like, with good advantage.

Balancing data processing loads between a plurality of units usually occurs at so-called task assignment time. That is, before data processing work ensues, a control mechanism determines which unit should do the task; once the task is assigned to a unit, that unit continues to operate even though it may be more heavily loaded than other units in the system. An example of such task assignment balancing is found in the IBM *Technical Disclosure Bulletin,* Vol. 20, No. 3, August 1977, pp. 937-938, in the article entitled "Load Balancing Control for a Multi-processor," by J. F. Baker and D. E. Holst. This article describes a loosely-coupled multi-processor control storage and memory system having load balance tables in various processors controlling the system. Load balance is achieved at assignment time based upon load balance tables which indicate a measurement of work Q depth. Load balance information is exchanged between the various processors of the memory system. The scheduling of timed processes is also described. Another example of load balancing at assignment time is found in a similar IBM Technical Disclosure Bulletin article, Vol. 14, No. 11, April 1972, in an article entitled "Input/Output Channel/Device Load Balancing Algorithm," by L. A. Jaikes, et al., wherein a peripheral subsystem has its work balanced at work assignment time.

Central processors or hosts in a multi-processing arrangement often provide for load balancing at task assignment time. An example is shown in U.S. Pat. No. 3,648,253 which shows tasks being assigned in a multiprocessor arrangement by a programmed scheduler 15 based upon time to go on a present task. The balancing of work loads is by assignment of tasks before the tasks are initiated. U.S. Pat. No. 4,032,899 shows a data switching network which balances data traffic on an aggregate processing load. This balancing is achieved by scheduling output traffic to ports by individual processors on an exclusive assignment basis; i.e., load balancing again is achieved when the task to be performed is first assigned.

Load balancing also has been achieved upon detection of an error condition; for example, U.S. Pat. No. 3,787,816 shows a multi-processing system which may be reconfigured in a controlled manner to redesignate the functions assigned to particular similar units so as to provide continued data processing capabilities after a malfunction or error.

Activity monitors have been employed for balancing loads. U.S. Pat. No. 3,588,837 shows a system for measuring activity of all major data paths using a time interval utilization sampling technique. The samples are dynamically recorded to represent the ratio of number of samples for revealing the number of samples in one time INTERVAL compared with the number of samples taken during an earlier time interval whereby the activity of all potential queuing points within a dynamic environment are recorded to provide statistical data concerning utilization of data-processing and communication equipment. This patent shows a measurement system but not load balancing which could be driven by such a measurement system.

Not all work load balancing has been achieved at assignment time; for example, U.S. Pat. No. 4,099,235 shows a method of operating a data processing system having two real-time data processors wherein given tasks are performed in one of the data processors depending upon the character of the task and which processor has been selected to operate on such tasks. Each of the data processors is continuously monitored for the purpose of continually determining the utilization ratio for each processor. Each processor is assigned a predetermined upper limit value of such utilization ratio which lies below the processors overload limit. Whenever such upper limit is exceeded, the tasks being performed in the one data processor are diverted to another data processor such that the receiving or another processor performs the diverted task. This patent shows a utilization threshold as a method of instigating shifting of ongoing tasks between data processors. The method disclosed is preferably a ratio of the holding time resulting from tasks being performed to the free time for indicating utilization ratio. This patent also refers to U.S. Pat. No. 3,665,404 wherein peripheral devices are switched between data processors by means of electromechanical switch in connection with balancing the input/output load between processors. According to U.S. Pat. No. 4,099,235, many of the real-time operations are similar to batch processing; accordingly, tasks that are not currently being operated upon can be readily transferred between the processors. This means that only inactive tasks are transferred for purpose of a load balancing.

In a dynamic data processing system where activity can vary beyond a control of the controlling data processors, the load balancing between the various data processors/data processing paths should be such to fully accommodate subsequent unforeseen dynamic changes in activities such that load balancing activity is minimized for maximizing data processing throughput.

SUMMARY OF THE INVENTION

It is an object of the present invention to provide load balancing between data processing units or paths that shift work exhibiting a predetermined portion of the total work load of the data processing unit/path to an alternate unit/path in a manner for minimizing load balancing activities and for maximizing data processing throughput.

In accordance with the present invention, a method of balancing work loads between parallel data processing paths, such as between plurality of input/output channels, plurality of control units in a peripheral subsystem, and a plurality of data processing units in a multi-processing unit environment, and includes segmenting the data processing in each path into work allocations. Further, the invention contemplates separately tabulating undesired delays in data processing for each of said work allocations in the respective parallel data processing paths. The separate tabulations are then totaled for each of the data processing paths. In each path the total tabulations are compared with a given threshold for such undesired delays. When one of the total tabulations for any one of the data-processing paths exceeds its threshold, a portion of the work allocation of its one data processing path can be transferred to a second data processing path, with the transfer selection being on a selected percentage of undesired delays for all work allocations. In one such data processing path, for example, a work allocation having a mean number of delays equal to one half the difference of the total tabulations of two paths can be transferred. It is preferred that no load balancing occur until a minimum difference in tabulations between paths is exceeded. In another version, a work allocation having an average number of such delays can be transferred. Upon any path tabulation exceeding the threshold, the total and work allocation tabulations are all recalibrated for instituting a new set of tabulations for load balancing.

In a preferred embodiment of the invention the data processing paths are control units in a peripheral subsystem. Work allocations are peripheral device assignments to respective control units with the undesired delays being channel command retrys (CCR's) sent to a host computer, such as described in U.S. Pat. No. 3,688,274.

When a receiving data processing unit/path has an excessive number of work allocations, such receiving units/path will reassign a work allocation to the sending units/path which work allocation has a least number of delays or can be a least used one of work allocations, i.e., the work allocation least contributing to the work load of the receiving units/path.

IN THE DRAWINGS

DETAILED DESCRIPTION

Figure 1:
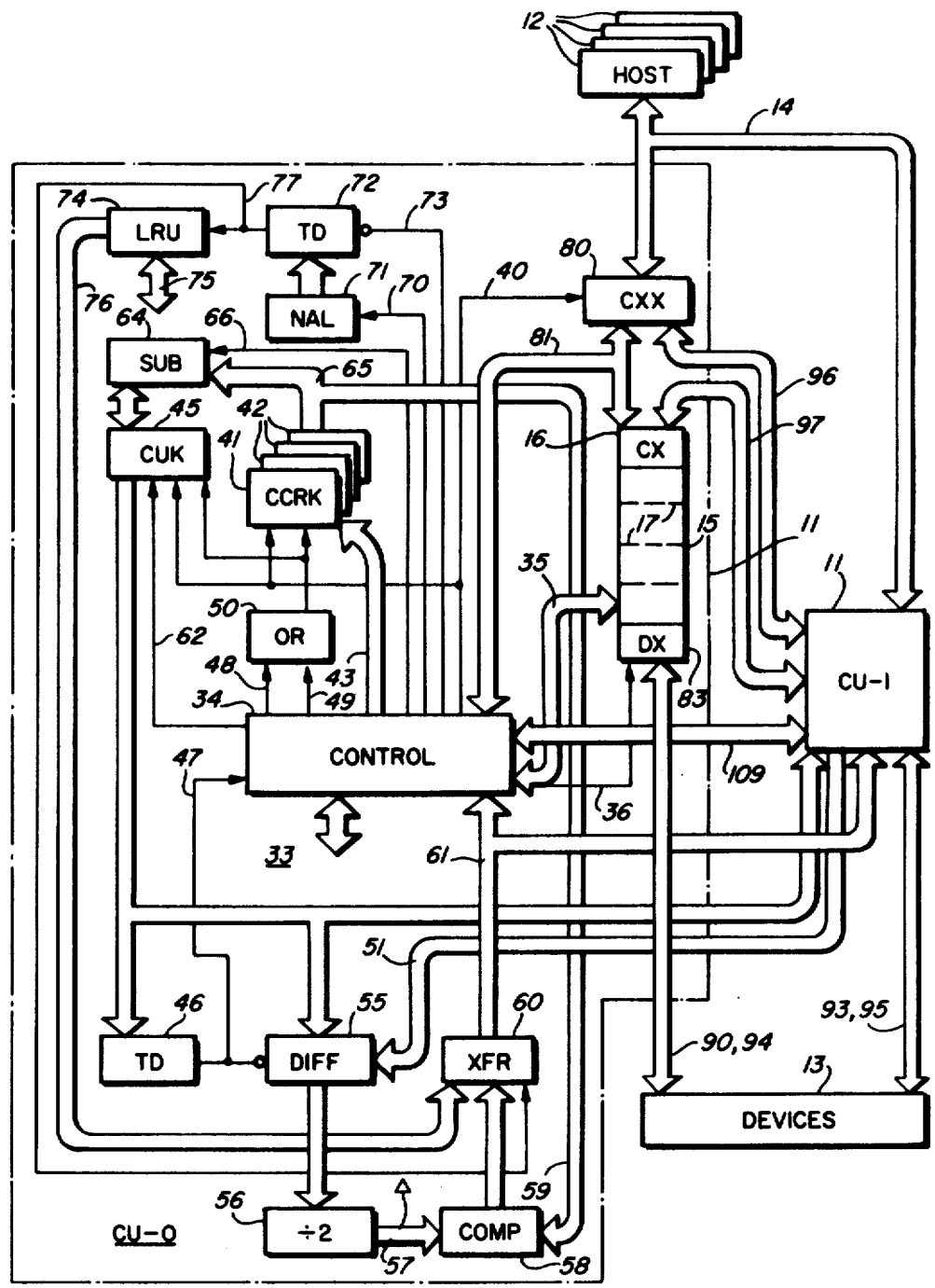
FIG. 1 is a diagram of a peripheral subsystem employing the present invention and in which the diagram accents certain aspects of the invention.

Referring now more particularly to the drawing, like numerals indicate like parts and structural features in the various diagrams. The invention is illustrated as being incorporated into storage subsystem 10 having a pair of control units 11, also denominated as CU-0 and CU-1. Storage subsystem 10 is connectable to a plurality of hosts 12 for receiving, storing and supplying data signals from and to the respective hosts under control of host operations as is practiced in the data processing art. Storage subsystem 10 stores data signals on behalf of the host in a plurality of data storage devices 13, such data storage devices include, without limitation, magnetic tape recorders, magnetic disk recorders, magnetic card recorders and unit record equipment. Communication between hosts 12 and storage subsystem 10 is via a plurality of input/output channels 14, constructed generally in accordance with the input/output channels set forth in Amdahl, et al., U.S. Pat. No. 3,400,371. For enhancing subsystem operations, each control unit 11 includes a data buffer 15, preferably constructed of a semiconductive random access memory element. Buffers 15 are the prime conduits between hosts 12 and devices 13; the arrangement is such that a host 12 can comunicate with a given device through either buffer 15 of either control unit 11. Communication from input/output channels 14 to buffer 15 is via channel adapter CXX 80 and bus 81 in CU-0 and via bus 96 to CU-1. It is understood that CU-1 is constructed identically to CU-0 with complementary connections (not shown) in CU-1. For example, bus 97 connects a channel adapter 14 (not shown) of CU-1 to buffer 15 of CU-0 via channel adapter circuits 16. Circuits 16 are known automatic data transfer (ADT) circuits commonly used in the data processing art. Since a plurality of devices 13 communicate through a single buffer 15 to a plurality of hosts 12, buffer 15 is dynamically managed as a plurality of segments indicated by dashed lines 17. That is, when a given device 13 is communicating with host 12, it is assigned or allocated a segment of buffer 15 for handling the data transfers. Devices that are not currently transferring data need not be assigned such segments; this allows buffer 15 to be relatively small, such as 256,000 bytes of storage. Buffer 15 allocations to devices are normally maintained between successive data transfers.

Figure 2:
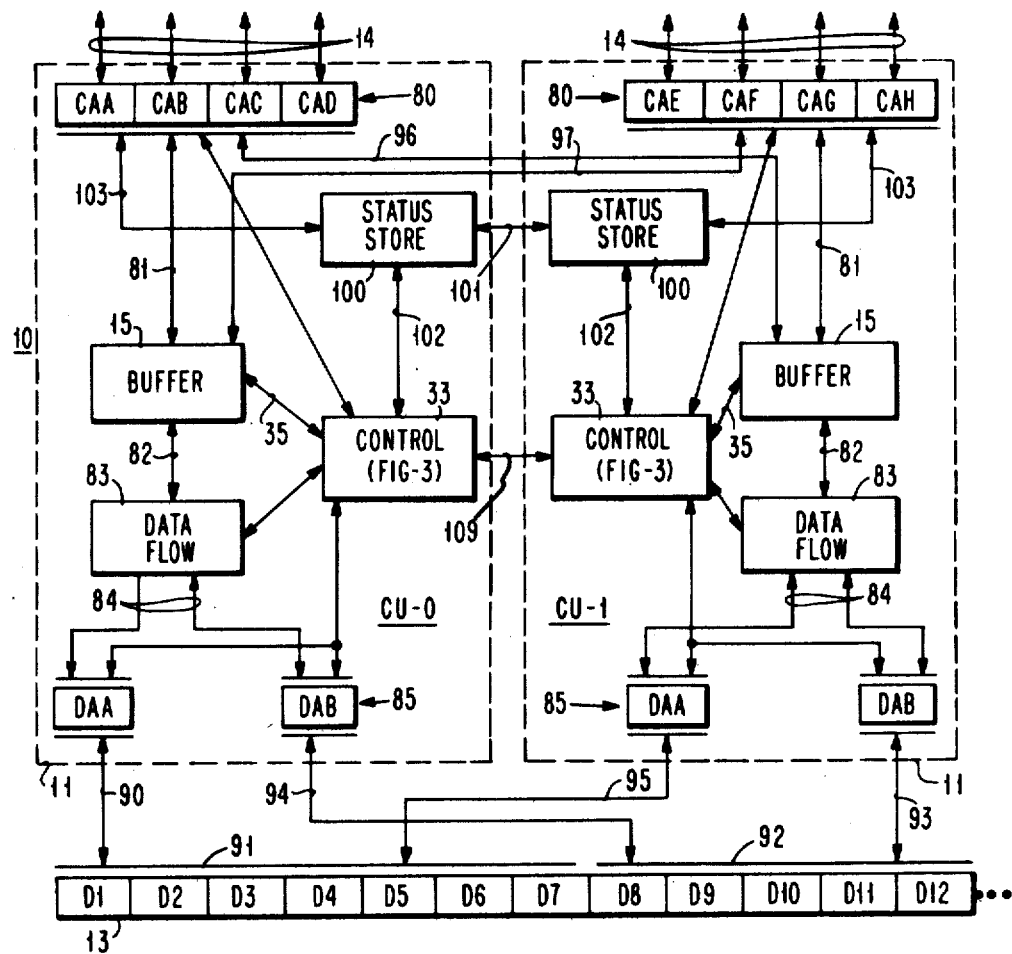
FIG. 2 is a logic diagram of a peripheral subsystem as would be constructed and which can incorporate teachings of the present invention.

Communication between buffer 15 and devices 13 is also through an automatic data transfer mechanism 83 and also referred to as data flow circuits 83 in FIG. 2. Connections from automatic data transfer DX 83 to the devices 13 is via a pair of cables 90 and 94, as detailed in FIG. 2. In a similar manner, CU-1 is connected to the devices 13 by another pair of cables 93, 95.

The control of storage subsystem 10 resides jointly in control units 11, it being understood that the control circuits of CU-1 are identical to the illustrated control circuits of CU-0. The showing in FIG. 1 is simplified in that those control circuits not pertinent to an understanding of the present invention are not detailed. Each control unit 11 includes a control 33, preferably including a programmed digital computer or microprocessor 110. Miscellaneous controls are indicated by numeral 34. Since the control of storage subsystem 10 is shared between CU-0 and CU-1, interconnecting bus 109 provides communications between the two control units 11 for exchanging control data necessary to the logical control of the storage subsystem. Miscellaneous control 34 also controls the automatic data transfer circuits CX 16 and DX 83 and the operation of buffer 15. Connections 81, 35 and 36 as shown in FIG. 2 represent this control.

A first portion of the invention relates to measurements of activity and work allocations in CU-0 and CU-1 to ensure that the work is balanced between the two control units on a dynamic basis. Since the buffers 15 of CU-0 and CU-1 are the prime conduits for data transfers between hosts 12 and devices 13, the status of the two buffers 15 at the time of a request for data by a host 12 is used as an indication of the current ability of the respective control units 11 for satisfying host 12 requests. For example, whenever a host 12 requests data from storage subsystem 10 and that data is not in the buffer 15, then that event is used as an indication of control unit work load. In a similar manner, if a host 12 desires to record data on a device 13 and the buffer segment indicated by numeral 17 is full of data, then that status is an indication of control unit work load. The fact that a buffer segment is not allocated to a device when a host requests the use of that device requiring buffer operation is also an indication of control unit work load. Such indications are provided by control 34 responding to a host 12 supplied input/output channel commands and control 34 determination that it cannot be immediately satisfied by supplying a channel command retry (CCR) signal over line 40 through CXX 80 to the requesting host 12. Such channel command retries are fully explained in R. L. Cormier, et al., U.S. Pat. No. 3,688,274. According to the invention, each control unit 11 includes circuitry and controls for utilizing the CCR signal to maintain load balance between the control units 11.

First, for each allocated segment of a buffer 15, a separate tally "CCRK" is provided for the number of CCR's. Since tallies, CCRK, are held in registers 41, 42. The CCR signal on line 40 also goes to respective registers 41, 42 for increasing the respective CCRK count. Each CCR signal is associated with an address of device 13 (the device to which the segment represented by register 41, 42 is allocated); registers 41, 42 are addressed accordingly. In this manner, the busy state for each of the allocated buffer segments is maintained as a separate tally. These separate tallies indicate the relative responsiveness of the respective device 13 and associated buffer 15 segments to host 12 operations. The combination of an allocated buffer segment with a recorder or device 13 is termed a logical device, i.e., to hosts 12 the device 13 and allocated segment appear as a single unit. Each host 12 in its communication with storage subsystem 10 always addresses devices 13; accordingly, the buffer 15 segments are not explicitly addressed by hosts 12 but are implicit within a device 13 address and then only when allocated to a device 13.

When a control unit 11 determines that its load status is such that work load balance should be investigated, then in accordance with the invention the various CCRK tallies are compared such that the logical device having a predetermined activity within the range of logical device activities may be transferred to the other or receiving control unit 11. The details of this determination will be described later. Transfer of a logical device includes deallocation of the buffer 15 segment allocated to the device 13 being transferred in a first or sending control unit 11, reassignment of the device 13 being transferred from the sending control unit 11 to a receiving control unit 11 and allocation of a portion of the buffer 15 in the receiving control unit to the just reassigned device 13. The allocation step creates a new logical device in the receiving control unit.

All acitivities of the storage subsystem 10 are based upon device 13 addresses. Control 34 responds to the received input/output commands of hosts 12 based when a CCR is supplied; control 34 supplies an address signal over bus 43 to select a one of the registers 41, 42 representing the logical device being addressed. To implement the invention in a preferred mode, each control unit 11 also maintains a total CCR count in CUK register 45. Each time a CCR signal is supplied over line 40, CUK register 45 contents are incremented by unity. Further, each time CUK 45 is incremented, the numerical contents thereof are compared with a threshold in threshold detector 46 for determining whether or not load balancing activity should be investigated. Once any CUK 45 count has reached this threshold, the indication is that CU-0 may have such a busy status that load balancing would enhance total operation of storage subsystem 10. Accordingly, threshhold detector TD 46 supplies a load balance signal over line 47 to control 34. This load balance signal is used later, and, as will be more fully described, to recalibrate all of the CCR counts in both control units. The TD 46 line 47 signal activates differencing circuits 55 for comparing the count of CUK 45 with signals received from CU-1 over cable 51 to determine the difference in total CCR counts between CU-0 and CU-1. If this difference exceeds a difference threshold set into difference circuit 55, then a set of signals are supplied to divide-by-two circuit 56. Circuit 56 divides the difference value of the CUK's of CU-0 and CU-1 by two to create a numerical value "delta." Delta is the mean value of the busy state difference, which means transfer of a logical device with this value of delay activity will balance the loads between CU-0 and CU-1.

To identify a logical device with "delta" activity, CU-0 activates scan circuit 58 to scan the contents of registers CCRK 41, 42 as received over bus 59 to find the CCRK that most closely matches "delta" on bus 57. This operation is a typical and known last scan to find a value meeting predetermined criteria. On identifying the closest CCRK count to the delta count, a set of signals is supplied to transfer circuit 60 which includes a device address signal stored with the identified CCRK in registers 41, 42 and supplied over bus 59 to bus 61. Bus 61 carries the device address signals as the identification of the device being reassigned from CU-0 to CU-1 to control 34 and to CU-1. Control 34 can relay the device address via bus 109. Control 34 responds to the bus 61 device address signal to deallocate indicated segment of buffer 15 and to take assignment away of device 13 from its control unit CU-0. CU-1 responds to the cable 109/bus 61 signals to receive a device 13 on a reassignment basis and to later allocate, as required, a segment in its buffer 15 to the recently received reassigned device 13. It is to be understood that control 34 will have a set of status signals relating to the present operational state of the device 13 being reassigned. These status signals are supplied over cable 109 to CU-1 so that CU-1 can store such status signals in its own registers, as will become apparent, such that the operation of device 13 can proceed in CU-1 as if no load balancing activity had occurred.

It is to be understood that CUK 45 signal contents not only traveled to TD circuit 46, but also are transferred to CU-1 as indicated in FIG. 1. For a transfer of a device 13 from CU-1 to CU-0, CU-0 requests CU-0 control 34 via cable 109 to transfer the signal contents of CUK 45 of CU-0 to CU-1. Further other control portions 34 of CU-0 receive the device 13 operational status signal from CU-1 as described for the transfer of a device 13 from CU-0 to CU-1. On the other hand, if the difference in threshold of circuits 55 is not exceeded, then no load balancing activity occurs. That is, the difference in load of CU-0 and CU-1 is so small that load balancing would not help total subsystem operation after considering time required for load balancing. Returning now to line 47, control 34 still responds to load balance signal for recalibrating the CCR count such that a new load balancing examination cycle is instituted. This recalibration is achieved by control 34 supplying a resetting signal over line 48 through OR circuit 50 to registers 41, 42, and 45 for resetting all of those registers to zero. Control 34 further responds to the line 47 signal to supply control signals over bus 109 to CU-1. These control signals first cause CU-1 to supply its CUK count over bus 51 to difference circuit 55. Additionally, CU-1 also responds to this control signal to recalibrate its CCRK's and CUK counts. Accordingly, all control units in storage subsystem 10 are recalibrated whenever either of the control units 11 have a CUK count exceeding a given threshold; this recalibration occurs irrespective of whether a load balance activity occurs. CCRK's and CUK are also recalibrated upon a SYSTEM RESET as indicated by line 49 extending from control 34 to OR circuit 50. SELECTIVE RESET also recalibrates all CCR counts.

During normal day-to-day operations of storage subsystem 10 with a plurality of hosts 12, operations with respect to a recorder or device 13 may be completed before a threshold indicated by TD 46 is exceeded or shortly after the CCR counts are recalibrated. Since such a device 13 is no longer needed by a host 12, the previously allocated buffer 15 segment indicated by numeral 17 of buffer 15 is deallocated. Accordingly, the previous busy state contributions of a deallocated device 13 should be removed from the CCR counts. To this end subtracter circuit 64 receives the CUK 45 count and subtracts the CCRK count of registers 41, 42 corresponding to the device being deallocated from the contents of CUK 45. This CCRK count is supplied over bus 65 in accordance with a device address on bus 43. Subtracter circuit 64 is activated by a control signal from control 34 on line 66. The adjustment of a count by subtraction and the selection of a register are sufficiently well known as to require no further description.

An additional portion of the invention to those described above relates to receiving control unit 11 analyzing its work allocation status, i.e., the number of devices 13 assigned to it for data processing operations. For example the capacity of a control unit 11 may be to handle eight devices at a given instant through its buffer 15. Accordingly, when it receives a reassigned device 13 during a load balancing activity, a control unit 11 may actually end up with nine devices assigned to it. To this end control 34 in a device receiving control unit 11 supplies a control signal over line 70 to increment counter 71. Counter had memorized the number of allocated devices (NAL) of the receiving control unit 11. When a device is deallocated, a separate control signal over line 70 decrements NAL 71. At each such device activity, a control signal on line 73 from control 34 activates threshold detector TD 72, which is normally set to eight. The counter contents of NAL 71 are analyzed by TD 72 to determine whether or not more than eight devices are currently assigned to CU-0. If the contents of NAL 71 are eight or less, no action is taken; however, for an NAL 71 content of nine, the threshold detector 72 supplies an active signal over line 77 to activate two circuits. The first circuit is LRU 74 which identifies the least recently used (LRU) device 13 and supplies the device address signal over bus 76 to transfer circuit 60 as concurrently activated by line 77 signal. Transfer circuit 60 of the receiving control unit 11 transfers a device address over bus 61 to its control 34 and to the sending load balancing control unit 11 for transferring a load activity device to such sending control unit 11. It is to be understood LRU is a list of devices by device address updated in a known manner by control 34 as indicated by double-headed arrow 75. Construction of LRU lists are well known and not further described for that reason. Alternatively, control 34 can select the device 13 with the lowest CCRK contained in registers 41 and 42. In either event a device having a minimal activity will be transferred back to the sending control unit 11 such that its work load is not substantially increased with respect to the total work load and yet the work allocation capacity of both control units 11 is never exceeded.

Figure 3:
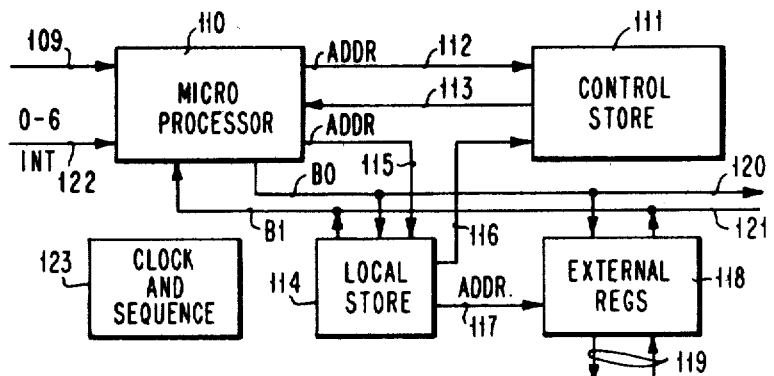
FIG. 3 is a logic diagram of a control portion of the FIG. 2 illustrated peripheral subsystem.
Figure 4:
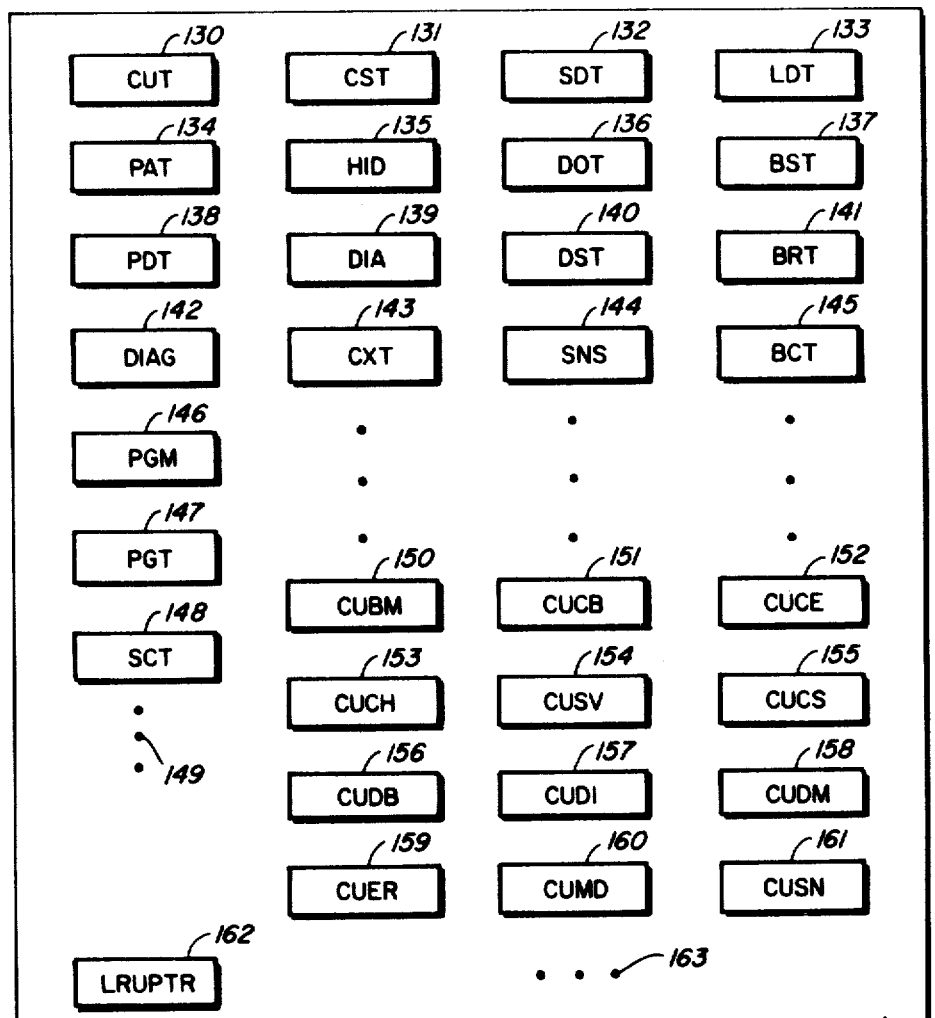
FIG. 4 is a map of a control memory portion of the FIG. 3 illustrated control.

Before further describing the invention, the environment in which the invention preferably resides is described with particular reference to FIGS. 2-4 which illustrates a storage subsystem employing reel-to-reel tape drives denominated as devices 13 DI-D12. The preferred arrangement includes two control units 11 denominated as CU-0 and CU-1. The arrangement is such that any of the devices can be connected to the host 12 via input/output channel 14 through either of the control units, CU-0 or CU-1. The attachment to a host 12 by each of the control units 11 is via a plurality of channel adapter circuits 80 which are individually denominated CAA-CAH. Each of the channel adapters 80 can communicate directly with a buffer 15 in either control unit 11. Both CU-0 and CU-1 are identically constructed. Accordingly, like numerals are indicating like parts in the two control units with the interconnections between the control units being separately denominated. Channel adapters CAA-CAD are in CU-0 while CAE-CAH are in CU-1. The respective channel adapters communicate with a buffer 15 in its own control unit via cable 81. Communications from the buffers to the devices 13 is over cable 82 through a data flow circuit 83, thence to cable 84 through a plurality of device adapter circuits 85. The device adapter circuits are separately denominated by characters DAA through DAQ in both control units 11. Data flow circuits 83 contain recording circuits. The programmed control 33 is electrically connected to all of the described portions of the respective control units 11 and operates generally in a known manner for storage subsystems as generally shown in Irwin U.S. Pat. No. 3,654,617, filed in U.S.A. Oct. 1, 1970, application Ser. No. 77,088. The interconnections between the control units 11 and the devices 13 is on a primary/secondary basis. Devices D1-D7 are primary to CU-0 and secondary to CU-1. In a similar vein, devices D8-D15 (D13-D16 not shown) are primary to CU-1 and secondary to CU-0. The significance of primary and secondary connections relates to which of the control units CU-0 or CU-1 maintain status for the respective devices; i.e., the control unit CU-0 maintains status information for D1-D8 while CU-1 primarily maintains status information for D8-D16. As will become apparent, both control units CU-0 and CU-1 memorize status indications for all of the devices 13. In the primary connections, adapters DAA-DAQ of CU-0 are connected via a cable 90 to all of the devices D1-D8. In a similar manner, the connection to D8-D16 to CU-1 is via cable 93 through adapters DAA-DAQ. The secondary connection from CU-0 to devices D8-D16 is via cable 94 while CU-1 is connected to devices D1-D8 via cable 95. The operations between the device adapters 85 and the various devices D1-D15 including tag control lines and bus data transfer lines which enables the control units 11 to closely control and operate devices 13.

In prior tape subsystems, the data flow paths were not fully multi-pathed in that the channel adapters 80 communicated only with the data flow circuits 83 in its respective control unit 11. In the preferred configuration, any of the channel adapters CAA-CAH can communicate with any of the devices 13 through either data flow circuit 83. The internal control unit 11 connection from the channel adapter CAA through CAD and adapter CAE-CAH of CU-1 are as previously described.

Connections from channel adapters CAA-CAD to the buffer 15 of CU-1 is via cable 96 whereas channel adapter CAE-CAH connects to the buffer 15 of CU-0 via cable 97. Accordingly, either data flow circuit 83 or buffer 15 can communicate with any of the hosts via any of the channel adapters. This arrangement, of course, requires close coordination between control units 11.

The total subsystem status is maintained in each of the control units 11 via a pair of status stores 100. Status stores 100 communicate with each other via a cable 101 independent of data processing operations; that is, as soon as CU-0 changes status, such as by selecting a device 13, the status store 100 in CU-0 immediately communicates to status store 100 in CU-1. Similarly, any crossconnection between the channel adapters 80 and the buffers 15 is immediately indicated in both status stores 100. Each of the status stores 100 contain a plurality of registers for containing bits relating to device status, buffer status, channel status and the like. Such status information reflects the selection status of the device, its busy status, contingent connections and all other status necessary for operating the storage subsystem with the input/output channel 14.

One and only one control unit 11 can change the configuration of the storage system at a given time. In this regard, cables 102 extend from the respective status store 100 to control 33. When control 33 of CU-0 wants to change logical configuration of the subsystem by selecting a device 13, for example, control 33 communicates with its status store 100 and requests permission to change subsystem status. Status store 100 is in an appropriate master state and permits control 33 to make a selection. Otherwise, status store 100 of CU-0 requests the status store 100 of CU-1 to give it the master state. Either CU 11 having the master state is the only one which can change logical configuration of the subsystem; the master state being shifted between the control units as configuration changes dictate. Status stores 100 also communicate with the respective channel adapters in the control units 11 via cables 103. Such communication includes the supplying of device busy status to the channel adapters from the status stores and the request for selection from the channel adapters to the status stores; that is, if CAB 80 wants to select device D6 on behalf of a host request, CAB 80 communicates with its status store 100 of CU0 requesting that the device D6 be selected. Status store 100 will supply the busy or not busy status of D6 to CAB. CAB then immediately responds to the host request with respect to device D6, thereby reducing selection and inquiry time between a host 12 and control units 11.

Control 33 can take different configurations. The configuration preferred for use in connection with the FIG. 2 illustrated storage subsystem is shown in FIG. 3. A programmed microprocessor 110 operates in accordance with microcode program stored in control store 111. Such microprograms enable microprocessor 110 to completely manage buffer 15, to provide supervised data flow circuit 83, to communicate with status store 100, and to supervise and enable selection of the channel adapters 80 and device adapters 85. Further communication between controls 33 in the two CU's 11 on a processor-to-processor basis is via cable 109 using known interprocessor communications techniques. Using known techniques, microprocessor 110 selects the microprograms of control store 111 via address bus 112. Control data is supplied from the control store 111, including microprogram instruction words, via bus 113. Of course, the usual idle scan loop for operating microprocessor 110 is resident in control store 111. Additionally, control 33 includes local store 114 which acts as a working control store for microprocessor 110. The addressible registers of local store 114 are addressed via bus 115. Bus 116 transfers signals from local store 114 to control store 111 under control of microprocessor 110; that is, it is preferred that the data stored in control store 111 from microprocessor 110 be transferred via local store 114. Communications between control 33 and all of the items shown in the control units 11 is via sets of external registers 118 which are addressed by address signals supplied over bus 117 from local store 114, no limitation thereto intended. Communications from external registers 118 to the various elements of the control units 11 is via a pair of unidirectional buses 119 which are electrical connections made in the usual manner.

Microprocessor 110 includes the bus out BO 120 and a bus in BI 121 which are connected to local store 114, external registers 118 and other units as may be desired. Microprocessor 110 is interrupt driven through a plurality of interrupt levels. These interrupts are supplied by the various elements of the control unit 11 over bus 122 which carries interrupt signals having levels 0 through 6, the priority of which is preassigned in accordance with the functions to be performed in the storage subsystem. The electrical signal timing of control units 11 is by clock and sequencer 123. Not only does clock and sequencer 123 provide timing pulses, but sequences microprocessor 110 for initializing control 33 to properly operate the control unit 11. The connections 119 from external registers 118 are to all the other portions of control unit 11.

FIG. 4 is a map of control store 111 showing control tables and microprogram groups. The tables, of course, contain those signals representing control information necessary for the successful operation of the storage subsystem. First the tables are described.

CUT 130 is a so-called control unit operation table which contains information-bearing signals pertaining to the entire control unit 11. This table relates to the operational status of the individual control unit CU-0 and CU-1 and which is not device 13 nor channel 14 related. CST 131 is a command status table which contains information-bearing signals describing the current command status which is being executed for an addressed device 13; that is, host 12 supplies channel commands over I/O channel 14 to the respective control units 11. CST 131 reflects the present status of the execution of those commands received by any of the channel adapters 80. SDT 132 contains information-bearing signals signifying the status of a selected device 13. This table enables the control units 11 to closely control and operate any of the devices 13. LDT 133 is a so-called logical device table which contains information-bearing signals signifying the status of each of the devices 13 as those devices are logically extended into the buffer 15 and the broad operational status of the respective devices which status information is more general in character than that appearing in SDT 132. PAT 134 is pending allocation table having information-bearing signals which queue devices 13 by their respective addresses which require buffer space when buffer space has not yet been allocated. The table is preferably a FIFO (first in, first out) table of the circular type. HID 135 is a table containing host identification signals for the hosts 12 communicating with the control units 11 via channel adapters 80. DOT 136 relates to device operations and contains information-bearing signals signifying schedule, active and completed device 13 operations. Such operations include tape transport, reading and writing and the like. BST 137 contains information-bearing signals relating to the status of the buffer 15. Such information-bearing signals relate to data transfers into and out of the buffer, allocation of buffer space and other buffer related functions. PDT 138 contains information-bearing signals signifying the buffer space of the buffer 15 which can be deallocated from devices 13 as soon as the activity with respect to such buffer space ceases. Deallocation does not occur until such activity stops. DIA 139 contains information signals signifying device information, control data relating to devices 13 and concerned with input/output channel 14 as well as intercontrol unit communication over cable 109 is stored here. Such information may originate because of device 13 operations as well as channel 14 operations. DST 140 stores information bearing signals relating to device status; that is, the last device status presented by the device 13 to control units 11 is stored in this area. BRT 141 relates to the operation of buffer 15. This table identifies the status of records in the buffer 15. Each record in the buffer will be entered into BRT 141 and may contain characterizing signals showing the status of the record with respect to its storage in buffer 15. DIAG 142 is a table used to control diagnostic functions executed in the control unit 11. CXT 143 contains information-bearing signals relating to transfer of signals between buffer 15 and any of the I/O channels 14 via the channel adapters 80. Such information includes direction of transfer and the address of the device 13 related to such transfer. SNS 144 holds information-bearing signals representing sense data to be reported to a host 12 as well as a so-called buffered log arranged by device 13 addresses. BCT 145 stores information-bearing signals relating to the dynamic logical address configuration of buffer 15. Such configuration will vary in accordance with the number of devices 13 connected to the control units, as well as whether there is one control unit 11 or two. PGM 146 is a so-called path group map which indicates which devices 13 may be logically connected to channel adapters 80 for logically partitioning the subsystem into one or more logical storage units. Path group table PGT 147 complements PGM 146 in that it includes identification signals identifying the logical partition and which of the channel adapters 80 is resident within each of the logical partitions. SCT 148 is a table containing signals relating to the idle scan for determining if any activity is to occur with respect to a given device 13. A diversity of actions can be instituted via SCT 148.

Numeral 149 indicates other tables not specifically referred to herein but that could be found in a constructed embodiment of the FIG. 2 illustrated storage subsystem. Such entry may include indications identifying the free space of buffer 15, priority queues for space of buffer 15, a segmentation indication for buffer 15, tracing status, timer tables for controlling time-outs and other miscellaneous areas necessary or desirable for constructing a multiple device storage subsystem.

Figure 10:
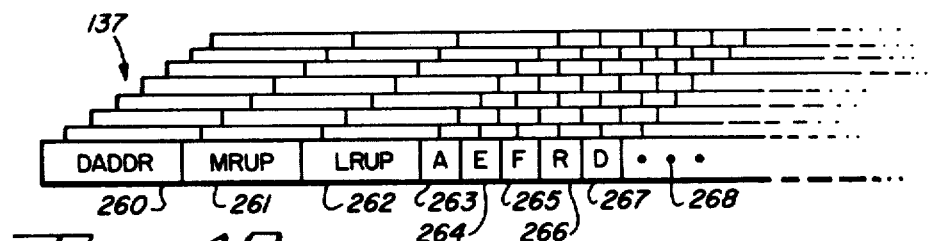
FIG. 10 shows a buffer status table usable by the control of FIG. 3 in practicing certain aspects of the present invention when a control unit contains a buffer such as shown in FIGS. 1 and 2.

Various program groups include CUBM 150 which are the microcode programs relating to the management of a buffer 15. CUCB 151 identifies those microcode programs relating to the transfer of signals between an I/O channel 14 and buffer 15 via channel adapters 80. CUCE 152 relates to setting up the tables described above in preparation for executing a command received from a host 12 over input/output channel 14. CUCH 153 relates to the channel control aspects, such as device selection and the like. CUSV 154 relates to an interrupt supervisor as it uses scan vectors in determining priority of the interrupts. CUCS 155 is a command support set of microcode which executes the commands set up by CUCE 152. CUDB 156 relates to the control and supervision of signal transfers between devices 13 and buffer 15. CUDI 157 relates to the control of the device adapters 85. CUDM 158 relates to the management of devices 13 such as scheduling their operations, etc. CUER 159 relates to error detection and recovery microcode. CUMD 160 relates to diagnostic procedures executed by a control unit 11. CUSN 161 relates to handling sense data such as stores in SNS 144. Numeral 163 indicates that the above program groupings may be modified and extended as the need arises for a storage subsystem. LRUPTR 162 is a pointer identifying the least recently used entry of the doubly linked list 261,262 shown in FIG. 10.

Figure 5:
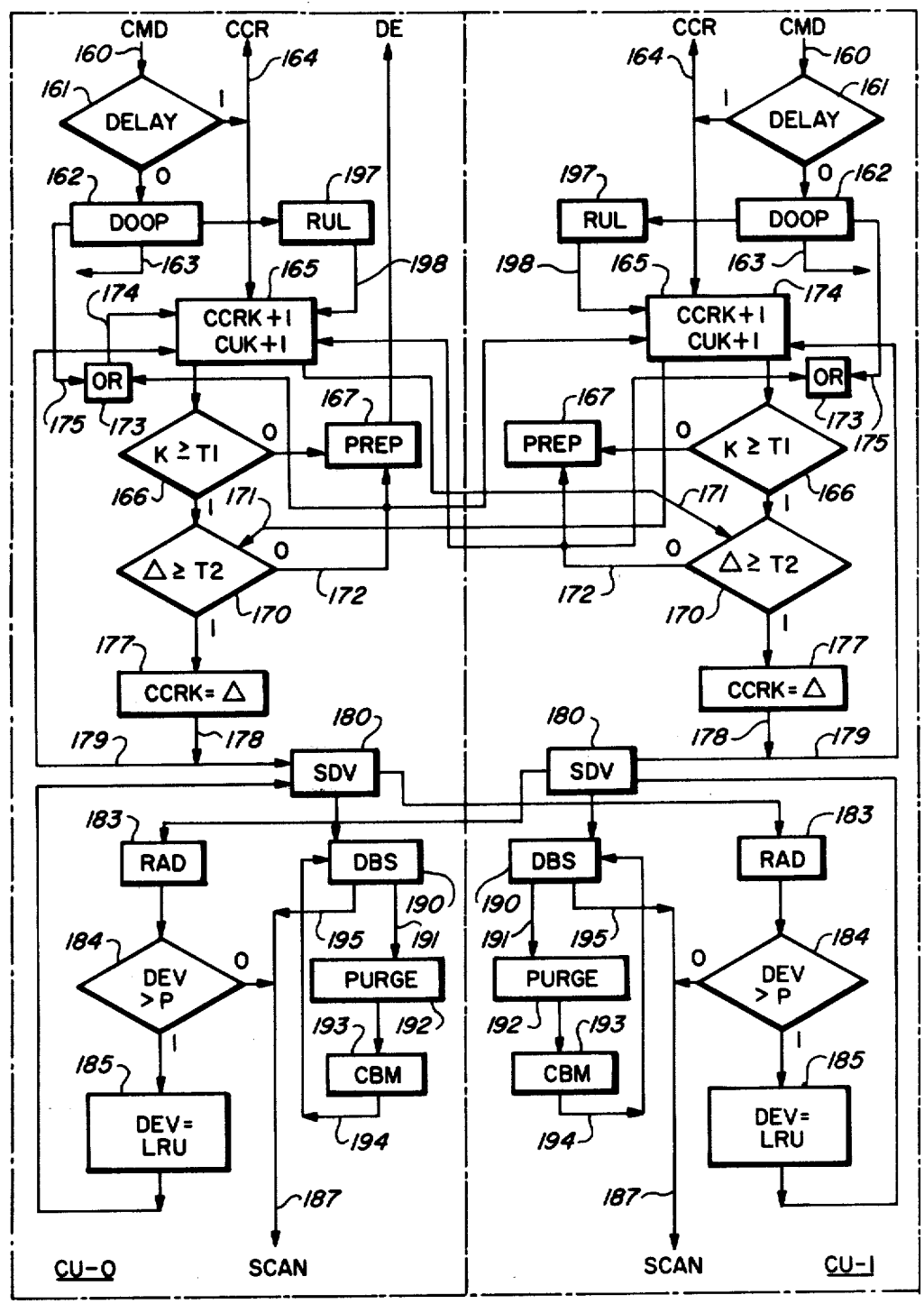
FIG. 5 is a generalized flow chart showing the work load balancing between the control units of the peripheral subsystem shown in FIGS. 1 and 2.

FIG. 5 shows the general flow of load balancing activity between control units 11. The left hand portion of FIG. 5 relates to CU-0 flow as a sending unit. In a similar manner CU-1 flow operations as a receiving unit are shown on the right hand portion of FIG. 5. Since both control units 11 are identical, both FIG. 5 portions for CU-0 and CU-1 are enumerated by the same numbers, the description applying to CU-0 applying equally to CU-1. First for CU-0, a command is received from host 12 at 1160. Whether or not a delay is to occur on execution of that command is determined at 1161. Such a delay is represented in FIG. 1 by CCR. If there is no delay, which is the most frequent occurrence, the operation for the command is performed at DOOP 1162. Commanded operations can be data transfers and the like. Completion of the command execution is indicated by arrow 163. On the other hand, a delay in command execution requires a CCR as indicated by line 164. The CCR 164 also increments at 165 the CCR and CUK counts by unity. Upon completion of this incrementing, CU-0 at 166 determines whether or not the CUK count is greater than or equal to threshold T1 (corresponding to circuits TD 46). If the threshold is not exceeded, then an addressed device 13 is prepared for commanded operations at PREP 167. Such preparations may include a transfer of data signals from a device 13 to an allocated buffer 15 segment, the recording of data signals from a buffer 15 segment in an addressed device 13, or the like. Upon successful completion of logical device preparation, a DEVICE END signal is supplied to a host 12 as indicated by arrow 168 and which is consistent with the teaching in U.S. Pat. No. 3,688,274.

If threshold T1 is exceeded, then CU-0 determines the difference between the CUK count of the two control units 11. The CUK count of CU-1 is received over line 171 and compared with the CUK count incremented at 165. If at step 170 the difference threshold T2 (corresponding to the threshold of differencing circuits 55) is not exceeded, then at 172 the logical device preparation at PREP 167 is instituted. Also, the line 172 action carries through OR function 173 to recalibrate by resetting the CUK and the CCRK's at 165. In CU-1 the line 172 also indicates that the corresponding CUK and CCRK counts in CU-1 are cleared OR function 173 and line 174. Additionally, DOOP 162 via line 175 may clear these counts such as required by the receipt of a selective or system reset command.

When both thresholds T1 and T2 are exceeded by the respective CCR count and CUK count differences, at 177 the CCRK equal to the delta value is selected. The selected device 13 has a CCRK less than or equal to the delta and such that the CCRK of the selected device is the minimal CCRK of all devices 13. In the preferred form, delta is one-half the difference between the CUK's of CU-0 and CU-1. Once the CCRK is identified, the associated device address is supplied over line 178 to send-device function 180 and over line 179 to delete the CCRK entry from 165. That is, the identified device address and associated CCRK and CUK counts no longer occurs in 165.

Turning now to receiving control unit CU-1, it receives the device information from CU-0 by reassign device function 183. Reassign device function 183 merely receives the device 13 operational status and then institutes a compare at 184 to determine if the number of assigned devices (work allocations) is greater than P, a work allocation threshold for CU-1. If not, CU-1 at 187 scans for work to be done.

If at 184 the number of devices exceeds the work allocation or assignment threshold P of the receiving control unit CU-1, then at 185 the logical device having the least activity is identified over line 186 to the SDV 180 of CU-1 which sends the device to CU-0 which receives this device through RAD 183, as just described for a CU-0 to CU-1 transfer.

In this preferred embodiment, a device buffer allocation in CU-1 is not made to a device 13. This means the logical device is incomplete. When a host 12 requests CU-1 to perform a data processing operation with respect to the newly assigned device 13, a delay is instituted until a buffer 15 segment 17 is assigned to device; i.e., the logical device is completed. Accordingly, upon a reassignment of device 13, the CCR count is at least unity since a delay is required for activating the logical device.

Sending a device either upon a load balancing activity or upon a work allocation exceeded activity requires a deallocation of a buffer 15 segment. Accordingly, SDV 180 activates deallocate buffer segment DBS 190. In the event that data is residing in buffer 15 segment of the logical device, then at 191 a purge operation 192 is instituted. In a write operation the buffer 15 data is written to the device 13 before the device transfer ensues. In a readback operation, the data in the buffer is erased and the tape recorder is repositioned to read the first record received in the buffer 15 from the recorder. On a disk storage apparatus for a read operation, no purging operation is required. Upon completion of purge 192, buffer management continues at CBM 193 which includes supplying a deallocate signal over 194 to DBS 190 to actually deallocate the buffer segment. Then at 195, CU-0 returns to scanning for work as at 187.

Returning to DOOP 162, the command may be to disconnect a device 13 that was previously addressed.

Such a command for a tape recorder can be a rewind and unload as indicated by RUL 197. RUL 197 through line 198 removes the CCRK for the device being rewound and unloaded, i.e., disconnected, and subtracts and CCRK from CUK such that appropriate load balancing monitoring can continue.

Figure 6:
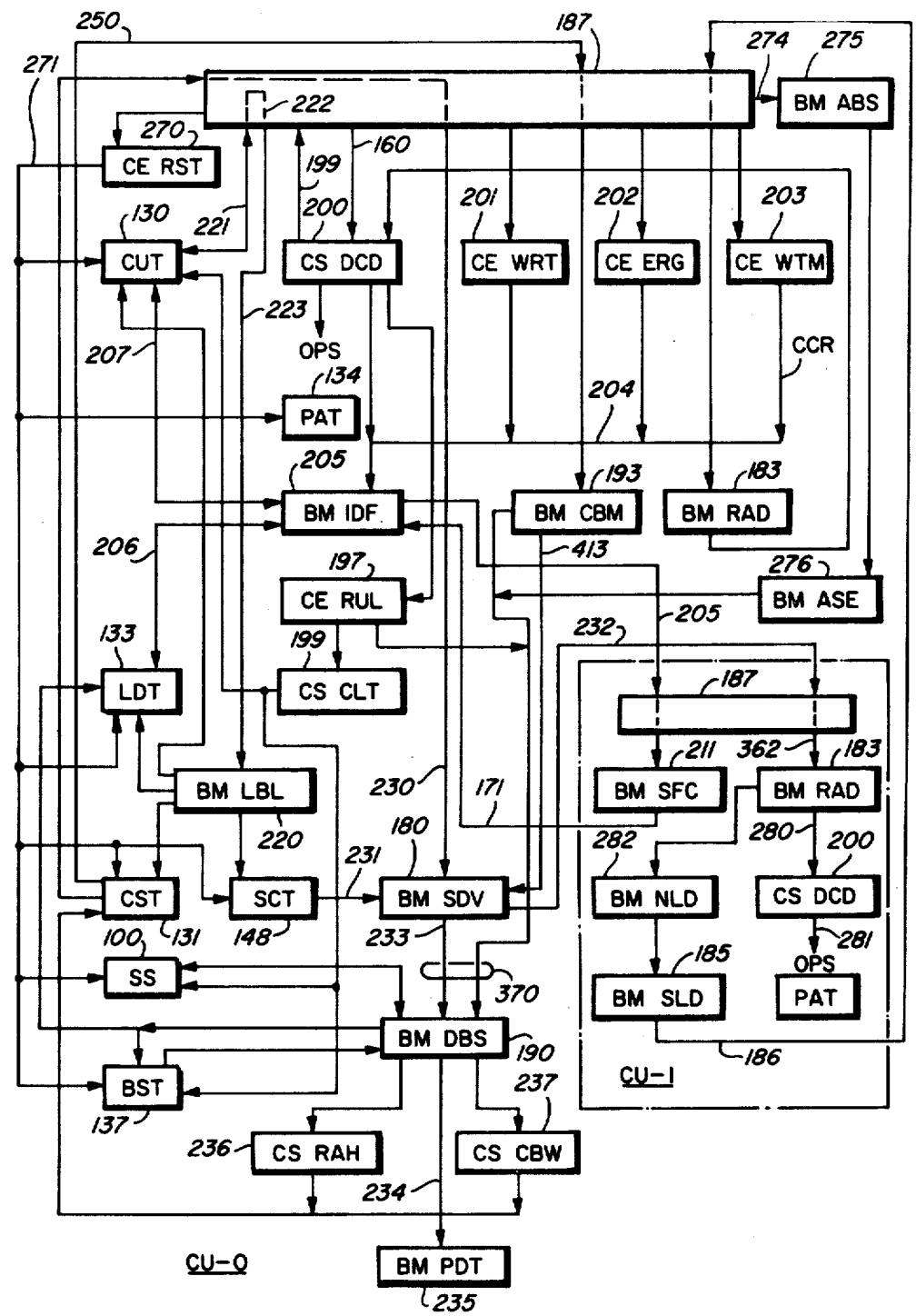
FIG. 6 is a logic diagram showing the flow of control in both control units for a load balancing operation.

Employing the apparatus shown in FIGS. 2 through 4, the invention in a preferred mode is implemented as generally shown in FIGS. 6 through 10 and FIG. 15. FIG. 6 shows a logic arrangement while FIGS. 7 through 10 and FIG. 15 show the memory arrangements used in connection with the FIG. 6 illustrated logic. The operation flow generally follows the flow chart of FIG. 5. The FIG. 6 logic is implemented in microprocessor 110 of FIG. 3 with the logic module computer of FIG. 6 and the tables represented in FIGS. 7 through 10 and FIG. 15 being stored in control store 111 at predetermined addressable storage locations. Microprocessor 110 is organized to scan for work automatically as is well known in the data processing art. Such scanning is done on a multi-level interrupt basis such that a highest priority section of interrupts are scanned first; then, if there are no such high priority interrupts, the next level of interrupts are scanned, and so forth, all as presented by numeral 187 in FIGS. 5 and 6.

The logic modules shown in FIGS. 6-24 are identified such as CS DCD 200. The left two characters, such as CS, identify the corresponding one of the program groups 150-161, such as CUCS, by the rightmost two digits of program group acronym.

A command is received through a channel adaptor 80 (FIG. 2) and transferred over bus 81 to control 34 which includes microprocessor 110 and its supportive program indicia. Upon receipt of the command by the microprocessor 110, as represented by arrow 160 (FIG. 6), the logic module CS DCD 200 is invoked for decoding the received command. CS DCD 200 also enables microprocessor 110 to determine whether or not a delay is to be incurred in the execution of the command. Other delays can be determined by logic modules CE WRT 201, CE ERG 202 or CE WTM 203, each of which can supply a CCR control over line 204 to invoke BM IDF 205. The logic module CE WRT 201 refers to a write set of operations within a control unit 11 wherein the buffer 15 segment allocated to the write operation via its logical device designation becomes filled with data. CE ERG 202 refers to forming an erased gap for error recovery from a recording error. CE WTM 203 relates to writing a so-called tape mark on a record tape. In any event, a CCR signal can be generated within microprocessor 110 from any one of a plurality of logic modules which respectively enables microprocessor 110 to perform diverse logical device related functions.

Figure 8:
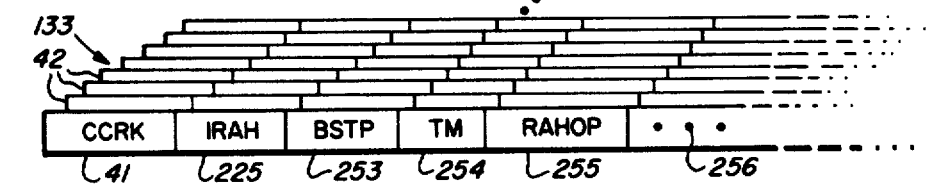
FIG. 8 is a diagram of a logical device table which stores certain characteristic information and address information for a logical device in the FIGS. 1 and 2 illustrated peripheral subsystem.
Figure 7:
FIG. 7 is a diagram of a control unit table used in connection with a preferred embodiment of the present invention.

Logic module BM IDF 205 increments the CCRK and CUK counts as indicated by lines 206 and 207. The terms IDF refers to increment device fault, i.e., a CCR signal results when the buffer allocation or other logical device function cannot be performed without causing a delay in command execution. The CCRK's are all contained in LDT 133 as shown in FIG. 8. One of the fields of the registers constituting LDT (logical device table) 133 includes registers 41 and 42 which respectively contain all of the CCRK's. LDT 133 is a portion of control store 111 and is addressable from a base address plus a device address of device 13. Accordingly, up to 16 registers are in LDT 133. BM IDF 205 enables microprocessor 110 to search the CCRK fields of LDT 133 in accordance with the device address associated with command received (arrow 160) for updating the appropriate CCRK. In a similar manner, as indicated by line 207, control unit table CUT 130 is accessed for the CUK 45 count. CUT 130 consists of predetermined addressable registers in control store 111.

BM IDF 205 enables microprocessor 110 to determine whether or not CUK 45 has exceeded its threshold. When the threshold is exceeded and a load balancing activity is to be investigated, microprocessor 110 is activated by BM IDF 205 to request a CUK count from CU-1. This action is indicated in FIG. 6 by line 210 extending to scan box 187 of CU-1. Line 210 corresponds to CU-0 sending signals to CU-1 over cable 109.

Within CU-1, logic module BM SFC (send fault count), 211 is invoked by scan 187 to transfer the CU-1 CUK to CU-0 as indicated by arrow 171. BM SFC 211 enables the CU-1 microprocessor 110 to recalibrate the CUK and CCRK's in CU-1. BM IDF 205 enables microprocessor 110 to perform the comparison of differential circuit 55. If the difference or delta exceeds a threshold, then microprocessor 110 in executing BM IDF 205 sets the LBINIT (load balance initiate) field 212 to the active position within CUT 130. LBINIT 212 being set is the memorization in CU-0 that load balancing activity is to occur. At this point in time, microprocessor 110 returns from BM IDF 205 to scan 187 for looking for higher priority interrupts. Microprocessor 110 in executing scan 187 will scan CUT 130 for LBINIT 212 to initiate load balancing acitivity as will be described.

CUT 130 is a key control table within CU-0 for controlling the sequencing of operations of the control unit. In addition to LBINIT 212, field MSGB (message buffer full) 213 indicates to CU-0 that a message has been received from CU-1. This is a mechanism used by CU-1 in responding to the request 210 from BM IDF 205 of CU-0. Upon detecting MSGB 213 set to the active condition, a message register (not shown) within control 33 is to be read to determine what action is to be performed. The receipt of a message as indicated by MSGB 213 has the same priority as receiving a command, i.e., the other control unit is transferring information related to a command or other function of some priority. In another form of practicing the invention in the FIG. 2 illustrated storage subsystem, status store 110 can exchange the messages via message registers (not shown) within the respective status stores via connections 101 which can be constructed in the same manner as interconnection 109. Continuing on with CUT 130, field 214 indicates whether the control unit is CU-0 or CU-1. In this manner both control units can be identically constructed. Field 215 indicates the number of devices physically present, i.e., indicates the maximum number of devices that can be assigned. The number of operating devices as indicated field 71, i.e., the devices 13 that are currently assigned to this control unit for data processing activity. The threshold used in connection with TD 46 and implemented by BM IDF 205, as will be later described, is contained in the CCR threshold field CCRT 217. The two control units 11 are complex machines; therefore, the control table CUT 130 has additional entries as indicated by ellipsis 218.

Figure 15:
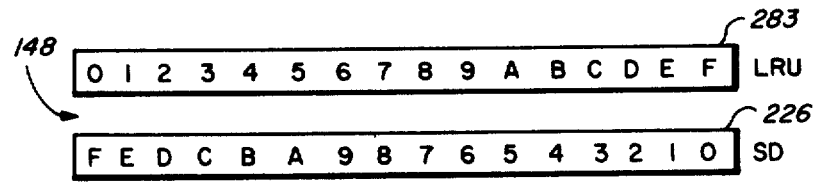
FIG. 15 shows a four byte set of registers constituting a sequence control table relating to sending devices between control units of the FIGS. 1 and 2 illustrated peripheral subsystem.

As microprocessor 110 scans for work, it will sense LBINIT 212 being active. Microprocessor 110 then activates BM LBL 220 (load balance logic module) as indicated by line 223. Scanning CUT 130 is indicated by line 221. Transfer of control to BM LBL 220 is indicated by dashed line 222. Microprocessor 110 responds to BM LBL 220 to find the device having a CCRK closest to but not greater than one-half of the difference between the CUK's of CU-0 and CU-1. Then LB field 224 of CST 131 is set to the active condition for indicating that the device indicated by the DADDR field 227 is being subjected to a load balancing (LB) activity. In LDT 133, field IRAH 225 is set to unity to indicate that the device 13 represented by the LDT register will no longer be allowed to be read ahead. That is the addressed device which is being subjected to load balancing activity should have no additional data stored in its allocated buffer 15 segment. Also, microprocessor 110 resets LBINIT 212 of CUT 130 and zeros CUK 45 of CUT 130 and all of CCRK's 41 in LDT 133. Continuation of a load balancing activity is based upon a setting of LB 224 section of CST 131 which identifies the device to be sent to the receiving control unit CU-1. Additionally, the device 13 to be transferred is indicated in SCT 148 register 226, as shown in FIG. 15. For example, if device D5 were to be sent as a load balancing device, then bit 5 of register 226 is set to the active condition as being a device to be sent. Also, field 228 of CST 131 indicates that the device 13 indicated in DADDR 227 is the device to be sent (SDV means send device) to CU-1. At this point scan 187 is re-entered by microprocessor 110.

When the priority of operations permit microprocessor 110 to return to the load balancing activity based upon the LB field 224 of CST 131, then logic module BM SDV 180 is activated, as indicated by arrow 230. The identity of the device to send to CU-1 is supplied to microprocessor 110 from SCT 148, as indicated by arrow 231. BM SDV 180 enables microprocessor 110 to transfer the addressed device to CU-1 based upon sending messages, as previously described, to CU-1. In FIG. 6 this action is represented by arrow 232 activating scan 187 of CU-1 to receive a message from CU-0, all of which as will be detailed later, which transfers all of the operation indicating status signals from CU-0 to CU-1 that relates to device 5, i.e., the device being transferred or reassigned to CU-1 for effecting load balancing activity. Since the device 13 is being transferred to CU-1, the buffer 15 allocation attributable to the device being transferred must be deallocated from the CU-0 buffer 15. Deallocation occurs from BM SDV 180 via arrow 233 activating logic module BM DBS 190 to deallocate the appropriate buffer 15 segment. If there is no data resident in the allocated segment, then microprocessor 110 follows arrow 234 to logic module CS PDT 235 which puts the buffer segment identification into pending deallocation table PDT 138, described earlier with respect to FIG. 4. When there is data in the buffer 15 segment, and the transferred device was in the read mode, logic module CS RAH 236 is activated. If the device was in a write mode, for recording the buffer 15 segment data on the respective device 13, write mode logic module CS CBW 237 is activated. Both of these logic modules enable microprocessor 110 to purge the buffer 15 segment of data. Microprocessor 110 will return to the scan 187 to ensure that higher priority interrupts are promptly handled. As a matter of fact, interrupts occur during most of the described load balancing activity.

Figure 9:
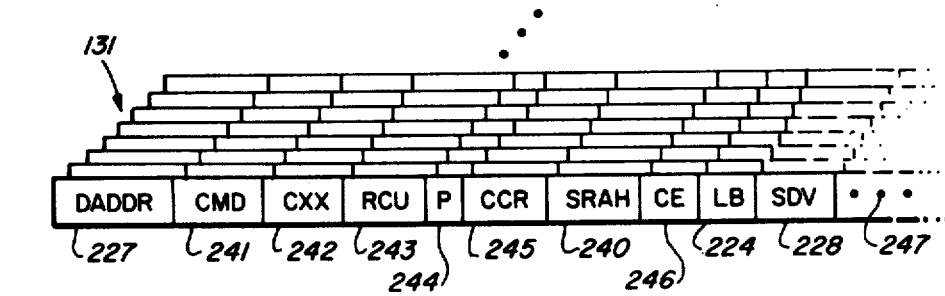
FIG. 9 illustrates a command status table used in connection with the operation of the FIGS. 1 and 2 illustrated peripheral subsystem particularly as those operations relate to balancing loads between a plurality of control units.

FIG. 9 illustrates CST 131. Each entry of CST 131 corresponds to a logical device having an address of a device 13 indicated in DADDR 227. A command currently being executed, if any, will be identified in field 241 while the channel adaptor 80 over which the command was received and which the logical device is primarily associated indicated in CXX 242. RCU 243 indicates which of the two control units 11 received the command being processed indicated in CMD 241. P field 244 indicates that a command is pending, i.e., command execution is proceeding. CCR 245 indicates that channel command retry status has been accepted by the channel for device indicated in DADDR 227. SRAH 240 is the suppressed read ahead field which inhibits the device 13 being transferred for a load balance from transferring data signals to buffer 15. SRAH 240 also is used in connection with other functions of the storage subsystem 10 not pertinent to an understanding of the present invention. CE 246 indicates that a CHANNEL END signal has been accepted by the channel; therefore, a DEVICE END (DE) signal is owed for the addressed device, as indicated by arrow 168 of FIG. 5. Ellipsis 247 indicates that CST 131 may have additional entries over and above those described for illustrating the present invention but necessary or desirable for constructing a practical embodiment of a storage subsystem 10. The logic modules CS RAH 236 and CS CBW 237 enable microprocessor 110 to purge buffer 15 of the buffered data related to the device 13 being transferred to CU-1. Subsequent to such purging, the P bit 244 of CST 131 is reset allowing deallocation of buffer 15 segment to occur. Accordingly, microprocessor 110 in executing scan 187 will activate logic module BM CBM 193 which is a continuing buffer management function designed to accommodate interrupted operations based upon buffer status, as will be more fully described with respect to FIG. 18. BM CBM 193 enables microprocessor 110 to activate logic module BM DBS 190 which in turn activates previously mentioned logic module BM PDT 235 to schedule the deallocation of the buffer 15 segment allocated to the device 13 being transferred in the load balancing activity.

The logical devices are identified and controlled via LDT 133 while the buffer 15 segment associated with the respective logical devices are controlled via BST 137. There is one register in BST 137 for each of the buffer 15 segments in the respective control units 11. Since all commands received by storage subsystem 10 are based upon device addresses and not upon buffer 15 segment addresses, LDT 133 is used as an indirect address base for BST 137. In this regard BSTP 253 in each of the registers of LDT 133 indicate the address of the corresponding entry in BST 137. Further in LDT 133, TM 254 indicates whether or not a tape mark is being written or has been read from a tape recording device 13. In those embodiments not employing tape recorders, TM 254 is dispensed with. RAHOP 255 is set to indicate a read ahead operation is currently occurring; a scheduled read ahead operation has not yet been performed. Other LDT 133 fields, not pertinent to the present invention, relating to logical devices consisting of a device 13 and an allocated buffer 15 segment are indicated by ellipsis 256.

BST 137 relating to buffer 15 segment operations has a plurality of fields for each of the buffer 15 segments. DADDR 260 contains the address of a device 13 to which the segment is allocated. If it is not allocated then bit 263 is reset to zero. The contents of DADDR 260 are then ignored. Fields 261, 262 respectively relate to the LRUP (least recently used pointers) and MRUP (most recently used pointer). MRUP indicates the buffer 15 segment which is the next most recently used segment while LRUP points to the next least recently used buffer 15 segment. E field 264 indicates that the buffer 15 segment currently is engaged; that is, a data processing operation is currently being performed involving the buffer 15 segment corresponding to the BST 137 entry. F field 265 indicates that the segment has been scheduled for freeing, i.e., deallocation. R field 266 indicates whether the buffer segment is in a read (R=1) mode or a write (R=0) mode. D (direction) field 267 indicates forward or backward operation. Ellipsis 268 indicates that in a constructed embodiment, other fields not necessary for describing the present invention may be included in a typical BST 137.

Returning to FIG. 6, module CE RST 270 responds to a received RESET command from a host 12 via scan 187 to reset the entire numerical contents of CUT 130, LDT 133, CST 131, SCT 148, status store 100, and BST 137 all as indicated by line 271. It is to be understood that in control store 111 the other indicated tables will also be reset. Insofar as practicing the present invention is concerned, it will be remembered that CCRK and CUK are reset or recalibrated via logic module CE RST 270. When a device 13 is selected for the first time, the CUK count and the CCRK count are not altered except when the first command is received from a host 12 following a selection requests activity; then a CCR is sent since no buffer space has been allocated. At this time the CCRK of the newly selected device is made unity and the CUK count is increased by one. Microprocessor 110 via scan 187 follows line 274 to respond to logic module BM ABS (allocate buffer segment) 275. This logic module is detailed in FIG. 21. If a single segment of buffer 15 is to be allocated, BM ASE 276 (allocate single segment) is activated; if a buffer segment is available, i.e., in a free state, then no more action by microprocessor 110 is required except for entry of the allocation status into BST 137. On the other hand, if all segments of buffer 15 are allocated, then BM ASE 276 enables microprocessor 110 to activate BM DBS 190 for deallocating a least recently used one of the buffer segments for assigning it to the newly activated and selected device 13. All of this activity is initiated via logic module CS DCD 200 upon receipt of a command as indicated by line 160. Pending allocation table PAT 134 is activated with a request for allocation via operations (OPS). Microprocessor 110 in scanning through scan 187 reads PAT 134, finds the request for allocation, and then activates BM ABS 275 as previously described.

In receiving CU-1, the transfer of a device is indicated by line 232 extending to scan 187 for activating logic module BM RAD (reassign device) 183. BM RAD 183 enables microprocessor 110 to treat the received message, i.e., transfer of a device 13, as a command. Accordingly, as indicated by arrow 280, logic module CS DCD 200 of CU-1 is activated as will become apparent. This action causes certain activity to occur necessary for CU-1 to operationally receive the transferred device. Arrow 281 indicates that other operations are initiated within CU-1 in response to CS DCD 200 responding to the received CU-0 message. PAT 134 can be accessed for a request for allocation to activate the allocate buffer segment (not shown) of CU-1. BM RAD 183 also enables microprocessor 110 to activate BM NLD 282 for determining the number of logical devices currently assigned to CU-1. If the number of logical devices exceeds the capacity of the control unit CU-1, then BM SLD (send least active device) 185 enables microprocessor to return the least active device to CU-0, as indicated by line 186. This transfer occurs in the same manner as BM SDV 180 enables CU-0 to transfer a device to CU-1.

Figures 11, 23:
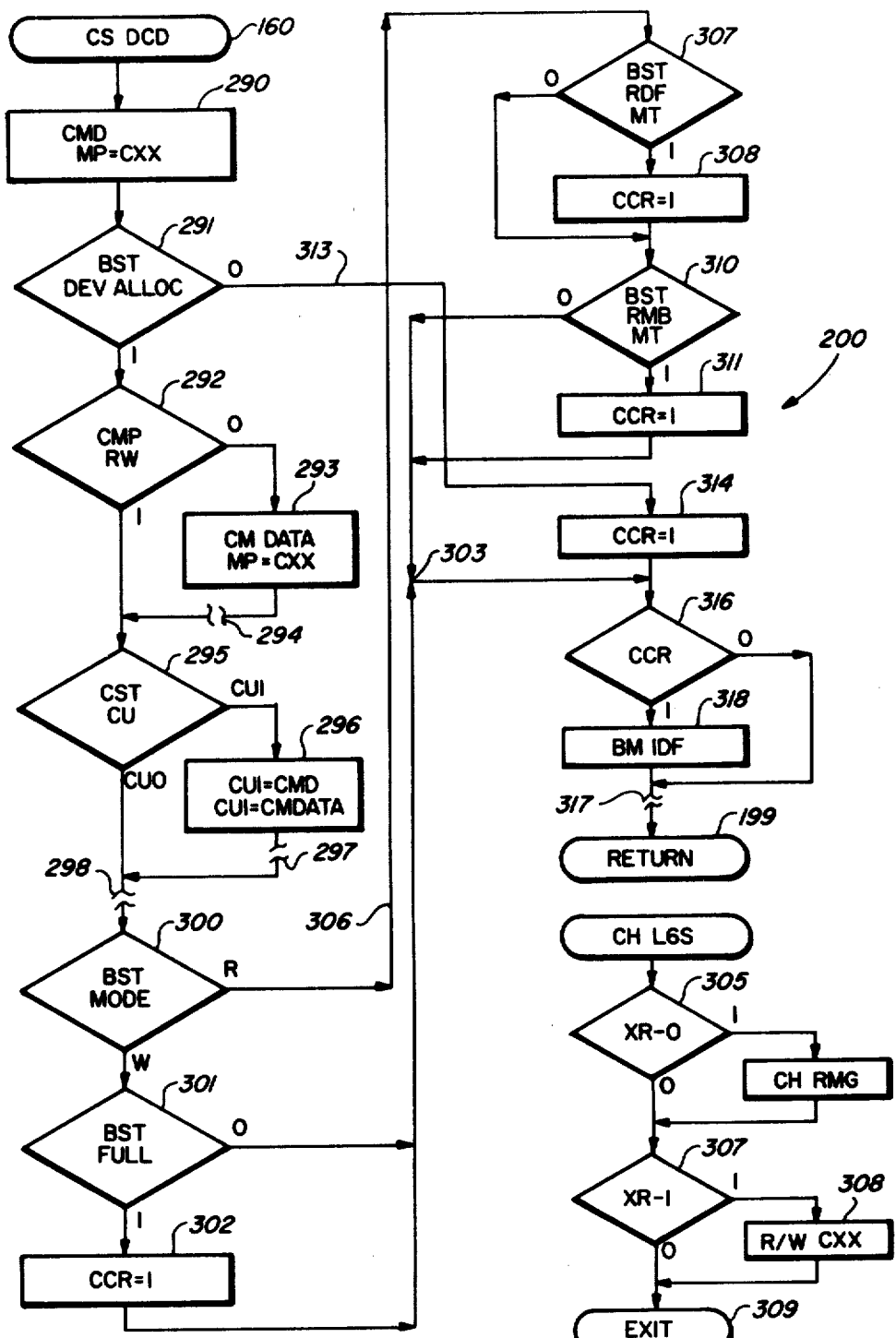
FIG. 11 is a logic diagram showing decoding input/output commands received by the control of FIG. 3.
FIG. 23 is a logic diagram illustrating a simple scan technique used in connection with actuating the logic modules used in connection with the operation of the control units of FIGS. 1 and 2 illustrated peripheral subsystem.

FIG. 11 illustrates the logic module CS DCD 200 as aforedescribed. The module is activated at 160 by receiving a command or alternatively by logic activation from microprocessor 110 acting through logic module BM RAD 183. The first action at 290 is to analyze the source of the activation, i.e., whether or not a command was received from an adapter 80 or a message received from the other control unit 11 (OCU). The device address of the device 13 being addressed (this address is saved in a work register) and the command code indicating what is to be performed by storage subsystem 10. After the above described housekeeping operations have been completed, microprocessor 110 at 291 senses the contents of CST 131 (FIG. 9) to determine whether or not the addressed device 13 has any identified errors or unusual conditions (in a field indicated by ellipsis 247) and that some activity for the addressed device 13 can occur. If the above criteria are met, then at 292, microprocessor 110 examines fields 241 of FIG. 9 to determine whether or not the command is a read or write command. If not a read or write at 293 and 294, auxiliary functions not pertinent to an understanding of the present invention are performed; these include receiving command data from the channel adapter 80, such as parameters modifying a logical control command, and the like. Numeral 294 indicates that the character of the command and the like has to be analyzed. Upon completion of such ancillary operations or when the command detected at 292 is a read or a write command, microprocessor at 295 determines from CST 131 which control unit is to execute the command stored in field 243. If the control unit is the other control unit, such as CU-1, then a message concerning the command is transferred to CU-1 via cable 109. Such message is transferred at 296 which includes the command data and the command itself. At 297, additional housekeeping functions are performed not pertinent to an understanding of the present invention. If the command is to be executed by the local control unit, i.e., CU-0, then no action need be taken. Further in decoding commands, additional non-pertinent steps are performed at 298. Finally at 300, microprocessor 110 reads BST 137 to determine the mode of operation of buffer 15, i.e., is it in a read or a write mode (R 266 of FIG. 10). All of the remaining steps shown in FIG. 11 relate to detection of a delay in command execution. For example, at 301 microprocessor 110 determines whether or not a buffer 15 segment allocated to the addressed device 13 (the device being transferred) is full. BST 137 in a field represented by ellipsis 268 indicates whether the buffer 15 segment represented by the entry of BST 137 corresponding to the DADDR field 260 is full or empty. If the buffer 15 segment is not full, then there is no delay in a write mode. If the buffer 15 segment is full in the write mode, then at 302 microprocessor 110 sets channel command retry and reports this delay to channel adapter 82 for relaying to host 12. From steps 301 or 302 the CCR check exit routine is entered through point 303, as later described.

When BST indicates the addressed device is in the read mode at logic step 300, microprocessor 110 follows arrow 306 to check whether or not a buffer 15 segment allocated to the addressed device 13 is empty. This check is achieved in four steps. First at 307, microprocessor 110 determines whether or not the logical device is in the forward or backward mode as indicated by direction field 267 and examines the buffer segment full or empty field (not shown) indicated by ellipsis 268. If the logical device is in the read forward mode and the buffer 15 segment is empty, then a delay is indicated by microprocessor 110 at 308 by setting CCR to unity and reporting a channel command retry to host 12. In a similar manner at 310, microprocessor 110 examines BST 137 entry associated with the addressed device 13 to determine whether or not the device is in the read backward mode (field 267) and empty (268). If the buffer 15 segment is empty, then at 311 a channel command retry is initiated. Returning momentarily to 291, if the device is not allocated as indicated by BST 137 entry 263, then microprocessor follows path 313 to set the channel command retry at 314. Microprocessor 110 has now checked all possible conditions in the decoding of commands and a receipt of messages from the other control units which may relate to a command that would institute a delay indicated by a channel command retry. The CCR checking routine is entered through point 303. At 316, microprocessing 110 checks whether or not a channel command retry has been instituted by any of the previously described operations. If not, then some programming "housekeeping" steps are performed at 317, which steps are not pertinent to an understanding of the present invention. Scan 187 is returned to at 199. On the other hand, if a delay is instituted, then the busy state (CCRK) of the addressed device and the busy state (CUK) of the control unit must be incremented. This is achieved by activating logic module BM IDF 205 at step 318.

Figure 12:
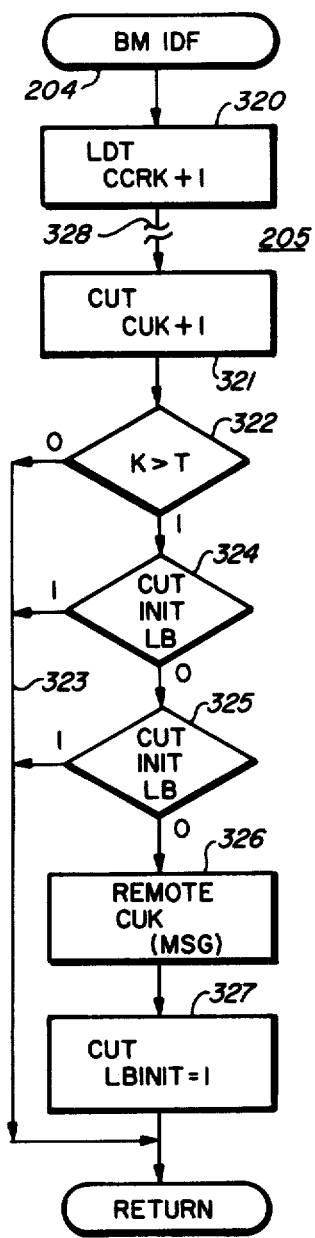
FIG. 12 is a logic diagram showing incrementation of undesired delays which are termed logical device faults.

Referring next to FIG. 12, BM IDF 205 is activated by microprocessor 110 at 204. Since a delay has already been determined to occur by CS DCD 200, microprocessor 110 at 320 increments CCRK for the addressed device 13; CCRK is contained in LDT 133 of FIG. 8. At 321 microprocessor 110 updates CUK 45 in CUT 130 for CU-0. At 322 microprocessor 110 determines whether or not CUK 45 exceeds threshold T1. If not, no load balancing activity need be initiated; accordingly, microprocessor 110 returns to CS DCD via 323. If the threshold T1 is exceeded at 322, microprocessor 110 at 324 determines whether or not load balancing activity is inhibited. Inhibition of load balancing in a constructed embodiment of the invention was for maintenance purposes only. Accordingly, the portion of CUT 130 relating to a load balance inhibition control field is in a field (not shown) represented by ellipsis 218. For insuring independent paths, the logical device may be pinned to a particular control unit such that it would be exempt from load balancing activity. Further, the entire control unit could be made exempt from load balancing activities where two or more control units may be employed in a storage subsystem. On the other hand, if there is no load balancing inhibit, microprocessor 110 at 325 senses LBINIT field 212 of CUT 130; if load balancing has already initiated, then no further activities for initiating load balancing need occur. Load balancing could have been initiated by the other control unit CU-1. If no load balancing has been initiated, then at 326 CUK 45 of CU-1 is read via cable 109 and stored for later use by BM LBL 220. At 327 microprocessor 110 sets LBINIT field 212 to unity and returns to CS DCD 200.

Figure 13:
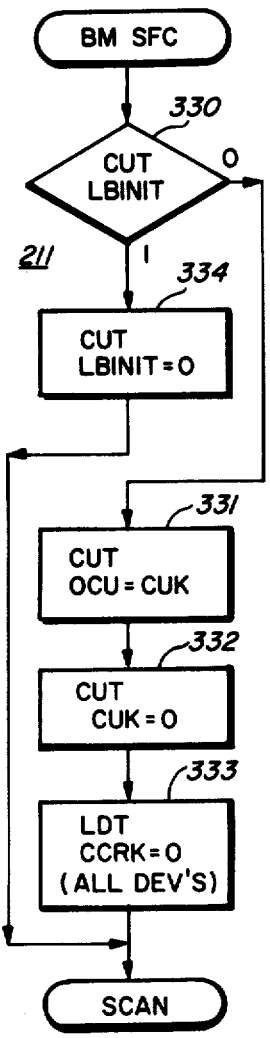
FIG. 13 is a logic diagram illustrating operation of a control unit for sending a logical device fault count to another control unit for implementing a load balancing operation.
Figure 14:
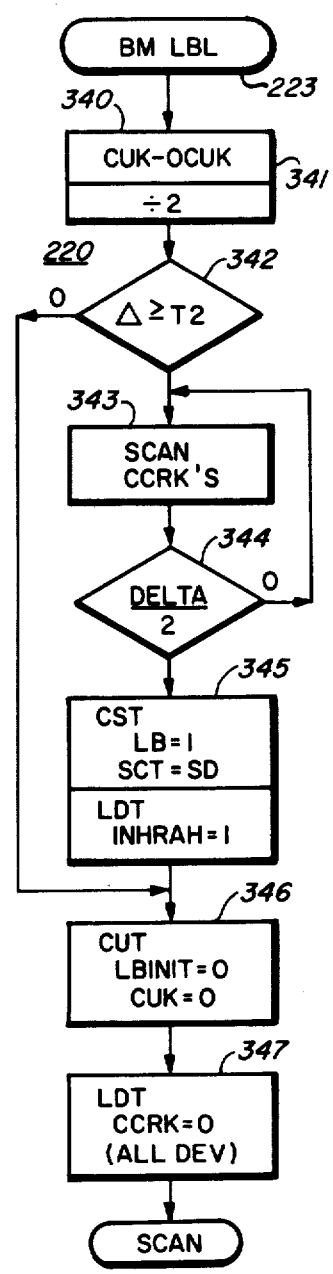
FIG. 14 is a logic diagram illustrating transferring a device from one control unit to another control unit in a load balancing operation.

Implementation of step 326 of BM IDF 205 requires action by CU-1 to send the fault count CUK via logic module BM SFC 211 (see FIG. 6). FIG. 13 shows the CU-1 logic module BM SFC 211. The CU-1 microprocessor 110 at 330 examines the CUT 130 field LBINIT 212 of CU-1 to see if load balancing has been initiated by CU-1. If not, then at 331 the CU-1 CUK 45 numerical contents are transferred to CU-0 (listed as OCU—other control unit—in step 331) which is the actual transfer of the CUK 45 count to CU-0 indicated by step 326 of FIG. 12. At 332 CU-1 clears the CUK 45 count of field 45 of its CUT 130. Then at 333 all of the CCRK fields of the CU-1 LDT 133 are cleared to zeros. If, on the other hand, LBINIT was equal to one, then at 334 microprocessor 110 of CU-1 resets its LBINIT to zero. This action inhibits any load balancing activity from CU-1. It should be noted that the above described action results in no load balancing when both control units 11 are at high load factor, yet the busy state counts CUK and CCRK are all recalibrated by resetting same to zero. Accordingly, the CUK 45 threshold T1 being exceeded always results in recalibrating the load balancing totals in control units 11 and only causes load balancing activity when there is a disparity in work load factors of the two control units 11.

Upon completion of the above described activity and if load balancing is to occur, the CUT 130 field 212 indicates to microprocessor 110 of CU-0 that load balancing will ensue. Microprocessor 110 through its scan 187 senses CUT 130 and initiates load balancing by activating BM LBL 220 as represented by numeral 223. First, CU-0 microprocessor 110 at 340 subtracts the CU-1 CUK 45 from the CU-0 CUK 45 to obtain a difference signal (as also represented by difference circuit 55 of FIG. 1). At 341 microprocessor 110 divides the difference digital signal by two to obtain a delta digital signal. The delta digital signal is compared with a threshold T2 at 342 to determine whether or not the CUK difference of the two control units 11 requires load balancing. In a preferred embodiment, the comparison against threshold T2 is performed after division as opposed to determining the threshold within differencing circuits 55 of FIG. 1. In any event, at 342, if the threshold T2 is not exceeded by the delta signal, then load balancing is not initiated, and, as later described, CUK, all CCRK's and LBINIT are reset. If threshold T2 is exceeded, then microprocessor 110 at 343 and 344 scans the CCRK's of LDT 133 to identify a logical device having a CCRK approximately equal to, but not greater than one-half the difference in the CUK counts. If an appropriate logical device is identified at 344 (CCRK=delta/2), it is memorized at logic step 345 in SCT 148 of FIG. 15 by setting the appropriate bit of SD register 226 to the active condition. Otherwise, a scan of CCRK's continues until the closest logical device (including a device 13) is found for transferring to CU-1 to effect load balancing. At 345 CST 131 is altered by setting the LB bit 224 to unity and the SDV field 228 to unity for the logical device identified in steps 343, 344. Also in LDT 133, read ahead for the identified logical device is inhibited by setting field 225. The last two steps of FIG. 14 recalibrate the busy state counts CUK and CCRK's at 346, which is entered from either step 342 or 345. Cut 130 LBINIT field 212 and CUK 45 are reset. AT 347 microprocessor 110 clears all CCRK's in in LDT 133 to zero. At this point load balancing has been initiated and microprocessor 110 returns to scan 187 to check for higher priority work; when higher priority work is not present in CU-0, then load balancing ensues as next described.

Figures 20, 25:
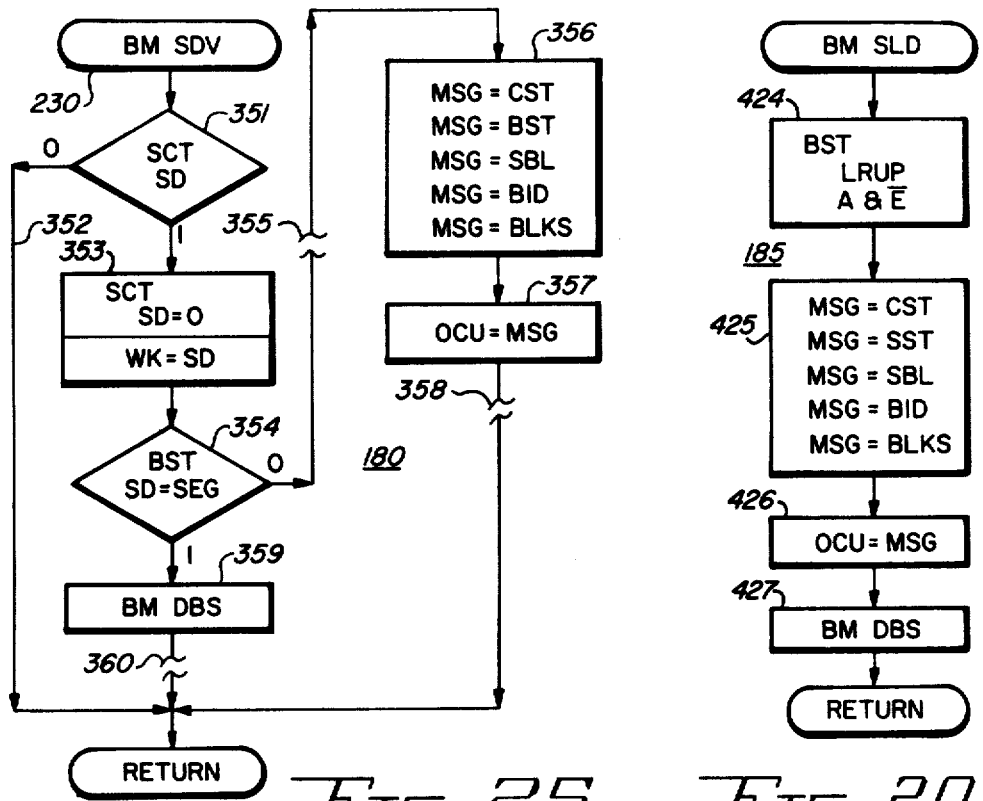
FIG. 20 is a logic diagram illustrating the transfer of a least active device from one control unit to another control unit.
FIG. 25 shows a sequence control table.

The next step in load balancing is to "send" the identified device for load balancing to CU-1. FIG. 25 illustrates how CU-0 transfers a device to CU-1. BM SDV 180 is activated by microprocessor 110 from scan 187, as at 230. At 351 microprocessor senses SCT 148 SD register 226 to see if there is a non-zero SD value. If there are no devices 13 to be sent, then microprocesssor 110 follows line 352 to return to scan 187. On the other hand, when SD is non-zero, at 353 microprocessor 110 transfers the value of SD register 226 to a work register (not shown) within the microprocessor 110 and resets SD register 226 to zero. At 354 microprocessor 110 determines from BST 137 whether or not a buffer 15 segment has been allocated to the device indicated by the SD value. If no segment is currently allocated, i.e., the A field 263 is zero, then a device 13 can be sent to CU-1 without delay. Some housekeeping operations are performed at 355 which are not pertinent to an understanding of the present invention. Then at 356 microprocessor 110 actually sends the device 13 transfer/message to CU-1 via cable 109 (transfer can be via status stores 100 and cable 101). The message consists of the numerical contents of CST 131 and BST 137 that pertain to the device being transferred and other information as may be necessary for CU-1 to operate with the transferred device. Such other information can include indentification data "BID" (block ID of data in buffer), block size of the buffer 15 segments (BLKS) and other miscellaneous (CID) control information (SBL). SBL refers to the sence buffered log of CU-0 such as used in control units for several years. At 357 the message actually is transmitted to CU-1 to be received in its message area. Then at 358, housekeeping routines are performed which include resetting of all the control information transferred to CU-1. CU-0 scan 187 is then returned to.

On the other hand, if a buffer 15 segment is allocated as indicated by the BST 137 entry relating to the device being transferred, then module BM DBS 190 is activated at 359 for deallocating the buffer 15 segment and providing a purge of the data in the buffer 15 segment as set forth in FIG. 6 and as described in detail later. Then a non-pertinent code is performed at 360. Scan 187 is returned to by CU-0 microprocessor 110.

Figures 16, 19:
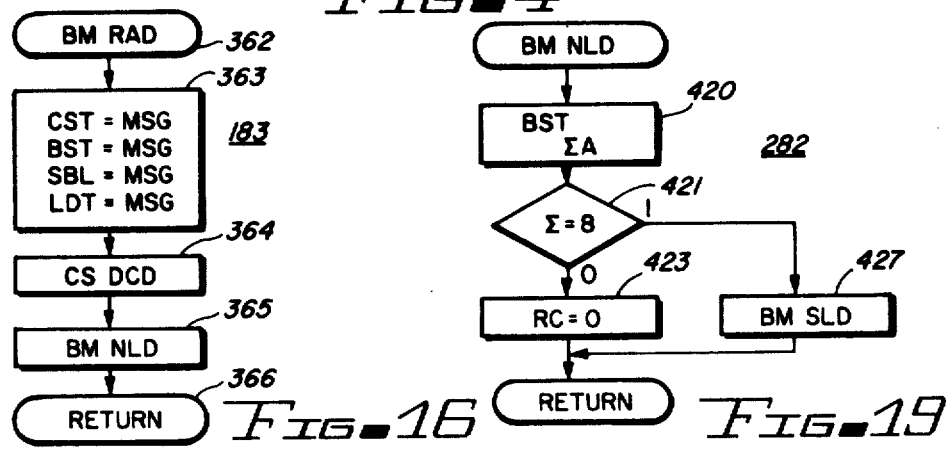
FIG. 16 is a logic diagram illustrating reallocation of a peripheral device to a receiving control unit.
FIG. 19 is a logic diagram illustrating a control unit counting the number of logical devices currently active with respect to such control unit.

FIG. 16 shows module BM RAD 183 as implemented in FIG. 6 for CU-1. This module enables the CU-1 microprocessor 110 to transfer the message received from CU-0, as described in FIG. 15, to the table and control areas of CU-1 such that the transferred device 13 becomes operational with respect to CU-1. CU-1 microprocessor 110 activates BM RAD 183 as at 362 such that at 363 the message received in the message area of CU-1 is transferred to CU-1's CST 131, BST 137, LDT 133, and the CU-1 SBL area and other control areas (not shown) of CU-1 necessary for an operational control of device 13 in a given practical embodiment. Then at 364 logic module CS DCD 200 of CU-1 is activated. It should be noted that execution of CS DCD 200 by the microprocessor 110 of CU-1 results in an analysis of the received message and the fact that no command has been received via a channel adapter 80. If, in fact, a command had been received, than CU-1 would proceed to perform that command even though CU-0 had received it. At 365, CU-1 microprocessor 110 activates BM NLD 282 to verify that the number of devices 13 assigned to CU-1 does not exceed 8. Then at 366 CU-1 returns to scan 187. At this point CU-1 is prepared to handle all data processing activities with respect to the just transferred device 13. Note that no buffer allocation has occurred, i.e., the logical device has not been reconstituted; therefore, the first received command for the just transferred device 13 will result in CS DCD 200 sending a CCR to the requesting host 12.

Figure 17:
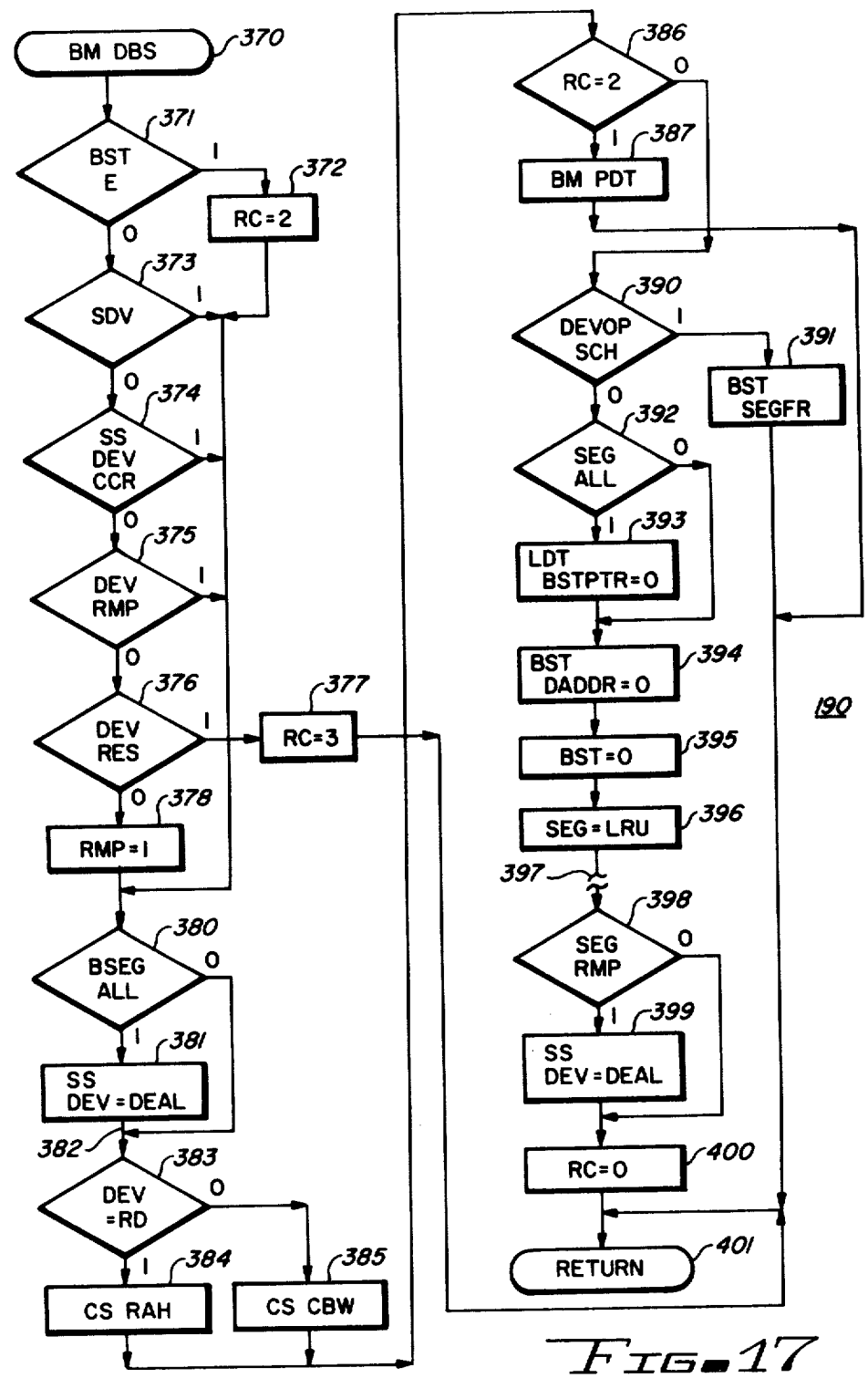
FIG. 17 is a logic diagram showing deallocation of a buffer segment in connection with transferring a device from a control unit which has a segment of a buffer allocated to such device.

Logic module BM DBS 190 shown in FIG. 17 is activated by any one of several other logic modules as shown in FIG. 6 and are collectively enumerated in FIG. 17 as 370. First microprocessor 110 at 371 examines BST 137 to determine whether or not the logical device which is to have its buffer 15 segment deallocated is engaged, i.e., active with a data processing operation. This determination is achieved by examining field 264. If it is engaged, then RC=2 at 372 for later use in determining action to be taken, such as insertion of the device address into the pending deallocation table PDT 138. If the buffer 15 segment to be deallocated is not engaged at 371, then at 373 microprocessor 110 determines whether or not the deallocation is a result of sending the device to CU-1. Steps 373 through 376 determine whether or not the addressed device should be reserved to microprocessor 110. If the present activity is a send device operation, than at 373 microprocessor 110 should not have exclusive control over the addressed device 13. Similarly, at 374 status store 100 is examined to see whether or not a CCR was sent to host 12. If so, microprocessor 110 should not have exclusive control over the addressed device 13. Also at 375, microprocessor 110 determines whether or not the addressed device is currently reserved to microprocessor 110. If it is reserved to microprocessor 110, no further reserving action is required. At 376 microprocessor 110 determines whether or not the device is reserved to a channel adaptor 80 for one of the hosts 12. If it is reserved to a host 12, then a return code RC is set to 3 at 377 indicating that before buffer deallocation can occur the data signal contents of the buffer 15 segment have to be purged. If all of the steps 373 through 376 indicated negative (zero) responses, then at 378 microprocessor 110 reserves the logical device including device 13 and buffer 15 segment to the microprocessor by setting RMP=1 in a work register and informing status store 100 that the logical device bearing the device 13 address is under exclusive control of microprocessor 110. Reserving the logical device to microprocessor 110 prevents a host 12 from selecting that device until completion of the deallocation procedures within CU-0, i.e., reserves device 13 for a storage subsystem activity. At 380 microprocessor 110 senses status store 100 to determine if status store 100 has a signal indicating that the buffer 15 segment to be deallocated is indicated as being allocated. This memorization is not shown since marks in memory are well known, that is, status store 100 has a memory indicating the logical configuration of the storage subsystem 10. If allocation of the buffer 15 segment to be deallocated is indicated as being allocated, then at 381 microprocessor 110 commands status store 100 to indicate that the buffer 15 segment is to be deallocated. From steps 380 and 381 microprocessor 110 follows line 382 to execute branch logic step 383. At 383 microprocessor 110 examines BST 137 field 246 to determine whether the device is in a read or write mode. At this point it should be noted that there is data in the buffer 15 segment to be deallocated. Accordingly, at 384 and 385 respectively for the read and write modes, modules CS RAH 236 and CS CBW 237 are respectively activated for purging data in a read mode and recording data in addressed device 13 in a write mode.

Following activation of these modules, at 386 microprocessor 110 checks the return code RC=2; if return code is 2, i.e., BST 137 as indicated in E field 264 that the device was engaged, BM PDT 235 is activated at 387 to place the identification of the buffer 15 segment into pending deallocation table PDT 138. From step 387 a return is made at 401. If RC≠2, then microprocessor 110 at 390 determines whether or not a device operation has been scheduled. Device operation scheduling is maintained in device operation table DOT 136 as referred to in FIG. 4. If a device 13 operation has been scheduled with respect to the buffer 15 segment being deallocated, then at 391 microprocessor 110 enters into BST 137 that the buffer 15 segment is to be freed by setting the F field 265 to unity. On the other hand, if no device operation was scheduled, then microprocessor 110 at 392 checks to see if the buffer 15 segment to be deallocated is allocated as indicated at 380. If allocation is indicated, then microprocessor 110 at 393 accesses LDT 133 for zeroing the BSTP field 253 of LDT 133 which destroys the addressability of the corresponding entry of BST 137, i.e., effectively erases the contents of BST 137 relating to the buffer 15 segment thereby deallocating same by destroying addressability of the BST 137 entry. At 394, 395 and 396 the remaining steps are performed for completing the deallocation of an empty buffer 15 segment. The DADDR field of BST 137 is zeroed, and at 395 the remaining fields of BST 137 pertaining to the buffer 15 segment and its logical device are all zeroed. At 396 the identified buffer 15 segment being deallocated is made the least recently used segment of buffer 15. Then at 397 non-pertinent logic steps are performed by microprocessor 110. At 398 microprocessor 110 determines whether or not the logical device, i.e., buffer 15 segment and device 13 are reserved to the microprocessor; if so, status store is accessed at 399 and the device is is indicated deallocated. These steps complete the deallocation function such that at 400 the return code RC is made equal to zero for later indicating to the microprocessor 110 that deallocation of the buffer segment has been successfully completed. Return 401 is then taken.

Figure 18:
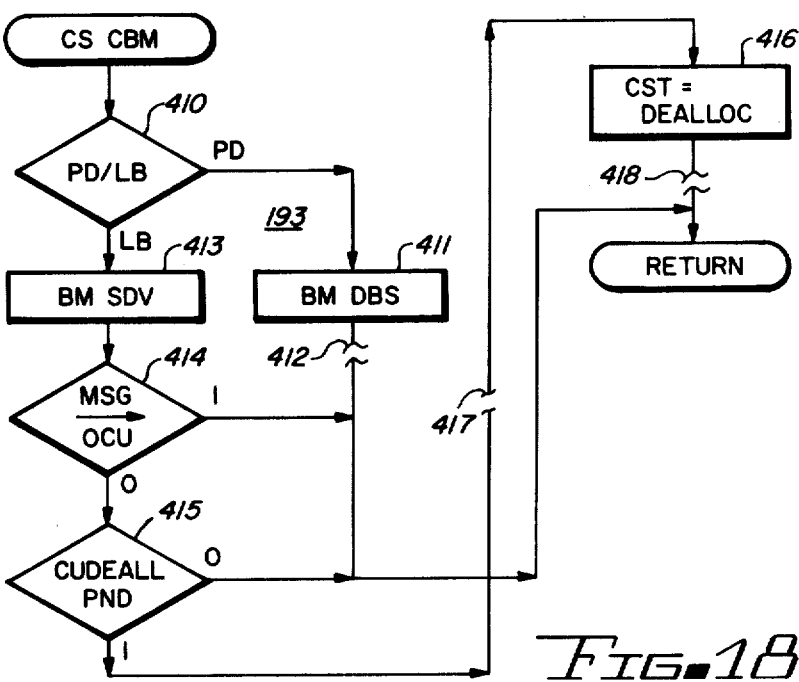
FIG. 18 is a logic diagram showing control unit activity in a load balancing operation which requires data processing functions to be performed before load balancing can be effected.

Referring next FIG. 18, logic module BM CBM 193 is described. It will be remembered from FIG. 6 that this logic module is used to continue deallocation of the buffer segment after execution of logic module CS RAH 236 and CS CBW 237 and their attendant purging of data from buffer 15. First microprocessor 110 at 410 determines whether BM CBM is handling a pending deallocation or a load balancing function resulting in a pending deallocation. This determination is achieved by sensing CST 131 field LB 224. If LB 224 is equal to zero, then microprocessor 110 at 411 activates module BM DBS 190 described in FIG. 17. Following execution of logic module BM DBS 190, additional non-pertinent logic steps are performed at 412 before returning to scan 187. On the other hand and of interest to the present description, a load balancing function indicated at 410 enables microprocessor 110 at 413 to activate logic module BM SDV 180 to perform functions previously described with respect to FIG. 25. At 414 microprocessor 110 checks to see if the massage to be sent to CU-1 by BM SDV 180 was successful. If successful, microprocessor returns to scan 187. On the other hand, if the message was not sent (such as caused by the buffer 15 segment not being purged yet, for example), at 415 microprocessor 110 checks to see if the deallocation is pending in PDT 138. If not, an error condition has occurred and is handled at the 417 non-pertinent logic steps. If a deallocation for this buffer 15 segment is pending in PDT 138, then CST 131 sets F field 265 to the active condition with a parameter field indicated by ellipsis 268 set to a code indicating the status of the deallocation procedure. Then at 418 non-pertinent logic steps can be performed prior to returning to scan 187.

FIG. 19 illustrates the check by CU-1 on the number of logical devices assigned to it via the execution of logic module BM NLD 282. The logic shown in FIG. 19 assumes that CUT 130 did not have fields 71 and 215; if CUT 130 has field 71 and 215, then the number of operating devices stored in section 71 can be compared with the number of devices 215 as opposed to execution of logic steps 420 which sums the number of BST 137 entries that currently have the A field 263 equal to 1. At 421 microprocessor 110 checks to see whether or not the summation is equal to 8, i.e., the maximum 8. If it is equal to 8, then the receipt of an additional device will exceed the CU-1 work allocation capacity and therefore logic module BM SLD 185 is activated at 422. Otherwise, receipt of the additional device is not troublesome. Accordingly, the return code of zero is sent at 423 indicating acceptability of the transferred device. In this regard, it is noted that in a plural control unit storage subsystem 10 that the number of devices allocatable to a given control unit 11 can be based upon the size of buffer 15, i.e., maybe less than the maximum number that can be successfully addressed via the control unit. For example, if the buffer 15 of control unit CU-1 is smaller than the buffer 15 of control unit CU-0, then the maximum number of units assignable to control unit CU-1 may be less than control unit CU-0. For example, if control unit CU-0 has six buffer segments and this number of segments has been determined to enable CU-0 to handle eight devices, then if CU-1 has four buffer segments, it can only handle six devices. It should be noted that the number of devices 13 can be greater than the number of buffer segments because many device functions may not require buffer activity. Buffer 15 segments are dynamically allocated among the various devices to still obtain efficiency of a fully buffered storage subsystem 10.

Referring next to FIG. 20, logic module BM SLD 185 is described. At 424 microprocessor 110 examines BST 137 to identify the device having an LRUP that is either zero or the lowest LRUP and is not engaged but allocated such that a corresponding logical device can be transferred. At 425 the device is transferred by sending the message as described for BM SDV 180. At 426, the actual message indicated in 425 is sent to CU-0 (OCU=MSG). At 427, BM DBS 190 of CU-1 (this module is not shown in FIG. 6) is activated to deallocate the device from buffer 15 of CU-1; deallocation is identical to the described CU-0 deallocation.

Figure 21:
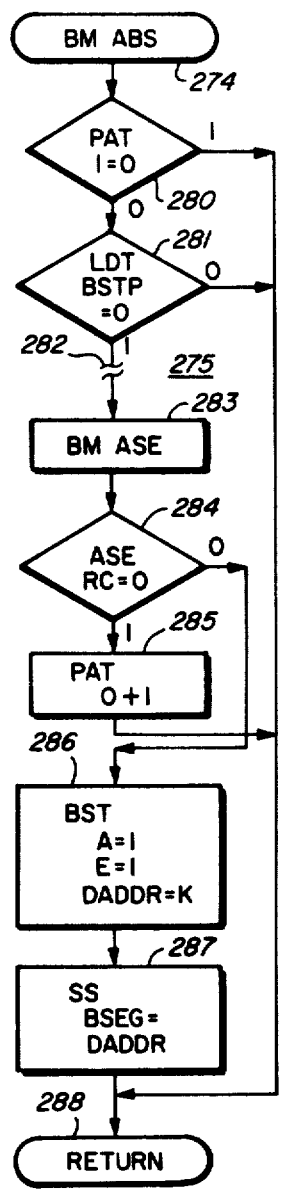
FIG. 21 is a logic diagram relating to the allocation of a buffer segment to a device such as upon receipt of a device from a load balancing transferor or upon initialization of a logical device.

Logic module BM ABS 275 is shown in FIG. 21. As indicated in FIG. 6, logic module BM ABS 275 is entered via 274. At 280 microprocessor 110 determines whether the pending allocation table PAT 134 is empty; if table pointers (not shown) to the first entry and table pointers (not shown) to the last entry in PAT 134 are equal, then PAT 134 is empty. With PAT 134 empty, microprocessor 110 returns at 288 to scan 187. On the other hand, if PAT 134 is not empty, then microprocessor 110 at 281 checks BSTP field 253 of LDT 133 for zero. If it is not zero, the logical device address has entries in both PAT 134 and PDT 138. Microprocessor 110 then returns to scan 187 via return point 288. If BSTP 253 of the LDT 133 entry corresponding to the addressed device is zero, then allocation of a buffer segment is appropriate. At 282 microprocessor 110 performs some non-pertinent logic steps, such as could be related to the size of the segments to be allocated to the device 13 for constituting a logical device. The present description assumes that a single segment will be allocated such as instituted at 283 by microprocessor 110 activating logic module BM ASE 276 described later with respect to FIG. 22. Upon completion of an attempt to allocate a single segment, microprocessor 110 at 284 checks the return code from logic module BM ASE 276. When RC=0, a buffer segment was successfully allocated to the addressed device 13. Then, at 285, the output pointer of PAT 134 is incremented by unity. At 286, following either step 284 or 285, microprocessor 110 alters the BST 137 corresponding entry to the just allocated buffer segment by setting A field 263 and E field 264 to unity for indicating that the indicated segment is allocated and engaged. Microprocessor 110 also sets DADDR 260 to the device address of the addressed device 13. At 287, microprocessor 110 accesses status store 100 to indicate the buffer segment has been allocated to the device indicated in DADDR 260 of BST 137. Finally, microprocessor 110 returns to the activating logic module at 288.

Figure 22:
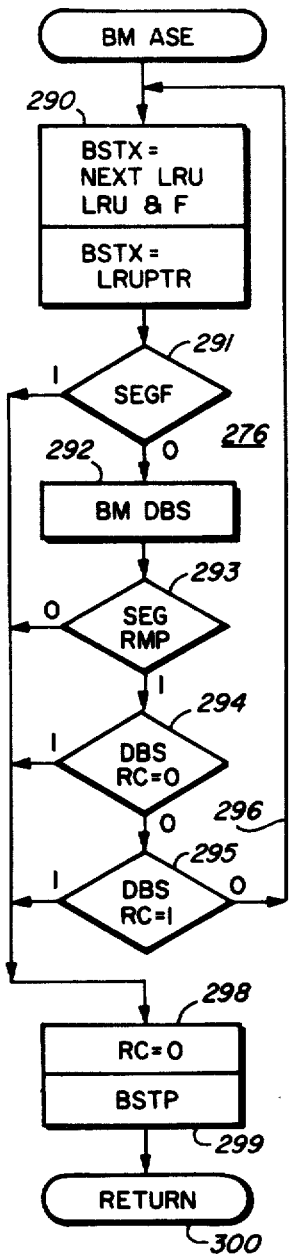
FIG. 22 is a logic diagram showing allocation of a single buffer segment to a device for constituting a logical device within a peripheral subsystem.

Logic module BM ASE 276, activated from logic module BM ABS 275, is described with respect to FIG. 22. An iterative loop consisting of steps 290 through 295 including return path 296 scans BST 137 to find a buffer 15 segment which is allocatable to the device 13. At 290, the BST 137 relating to the least recently used buffer 15 segment (BST X) is addressed. The least recently used segment is identified in LRUPTR 162. The next least recently used segment is indicated by the MRUP field 261 of each logical device; the scan of BST follows the sequence indicated by the MRUP entries. The scan of BST is terminated when MRUP=0 (indicates end of the LRU list) unless the BST scan is earlier terminated as hereinafter described. Using this link technique, all of the fields in BST 137 are scanned in the loop to be described. For the LRU or other buffer 15 segment represented by BST 137 entry currently being examined, microprocessor 110 at 291 determines whether or not the F field 265 indicates that the segment is a free segment. If it is a free segment, then allocation can occur which breaks the scan loop. Then microprocessor 110 performs the return to logic module BM ABS 275 via steps 298-300 as will be later described. If the segment entry being examined in BST 137 indicates the segment is not free, then logic module BM DBS 190 is activated at 292 in an attempt to deallocate that segment such that it can be reassigned to the transferred device 13. Upon completion of logic module BM DBS 190, microprocessor 110 at 293 determines whether or not the segment (SEG) being examined has been reserved to the microprocessor (RMP); if not reserved, then the segment can be reassigned which again breaks the scan loop. If the segment is reserved to the microprocessor at 293, then certain actions have to occur with respect to the logical device represented by the buffer 15 segment before it can be deallocated. Accordingly, microprocessor 110 then proceeds to 294 to check for the return code RC from logic module BM DBS 190; if the return code is zero, this means that the segment represented by the BST 137 entry was in fact deallocated. This result also breaks the loop 290-296 allowing performance of later described exit point of BM ASE 276. If a return code is other than zero, then deallocation did not occur. Such non-deallocation results in microprocessor 110 checking for the DBS return code of unit at 295. If RC=1, then a purge operation is occurring, and it can be reallocated in the immediate future. The allocation is made pending in PAT 134 to satisfy all the requested allocation requirements. Otherwise, from 295, microprocessor 110 follows return line 296 to repeat the loop beginning at step 290. The next BST 137 entry is examined as indicated by the MRUP field 261 of the entry that was just examined.

Upon completion of the loop, microprocessor 110 at 298 sets a return code of zero indicating that a buffer segment was successfully identified for allocation. The BSTP field 253 of LDT 133 identifies the BST 137 entry; hence the buffer 15 segment identity is returned at 299 with the return code RC=0, such that microprocessor 110 later can readily identify which buffer 15 segment is to be allocated. At 300, microprocessor 110 returns to logic module BM ABS 275.

A small portion of scan 187 is illustrated in FIG. 23 for indicating the tenor of the interrupt scanning. All of the scanning within scan 187 can be constructed in a similar manner. That portion illustrated is so-called CH L6S which relates to receiving a message from the other control unit 11, actions with the channel adapter such as receiving a command, and relates to sending fault counts (logic module BM SFC 211 and the like including activation of BM LBL 220). FIG. 23 constitutes two scan loops represented respectively by numerals 305 and 307. Numeral 305 represents scanning an external register 118 defined as XR-0 which receives interrupts for scan CH L6S. The contents of XR-0 are scanned during step 305 using known bit shifting techniques to find a binary 1 representing an interrupt or request for attention. Upon detection of a binary 1, logic module 306 CH RMG (not shown in FIG. 6) is activated for receiving a message from the other control unit. Details of receiving a message will follow known data processing techniques for exchanging control data between two or more data processing units. The interrupt scan for levels of interrupts is by the usual scanning circuits (not shown). The microcode logic scan for further information within a level, viz. L6S, is selected by such interrupt scanning circuits. Numeral 307 represents scanning external register 118 denominated as XR-1. Upon detection of a one at 308, a channel adaptor 80 represented by CXX is accessed by the microprocessor 110 for receiving a command, transferring data to a channel adaptor and the like. Upon completion of 305 and 307 which will scan each of the bit positions in the two external registers 118 identified as XR0 and XR1, an exit is taken at 309 which then invokes a lower level scan for performing less priority work. Hardware circuits (not shown) can detect presence of a 1 in any of the external registers for invoking the scans 305, 307 or higher priority scans by microprocessor 110 as is well known in processing interrupts in the data processing art.

Figure 24:
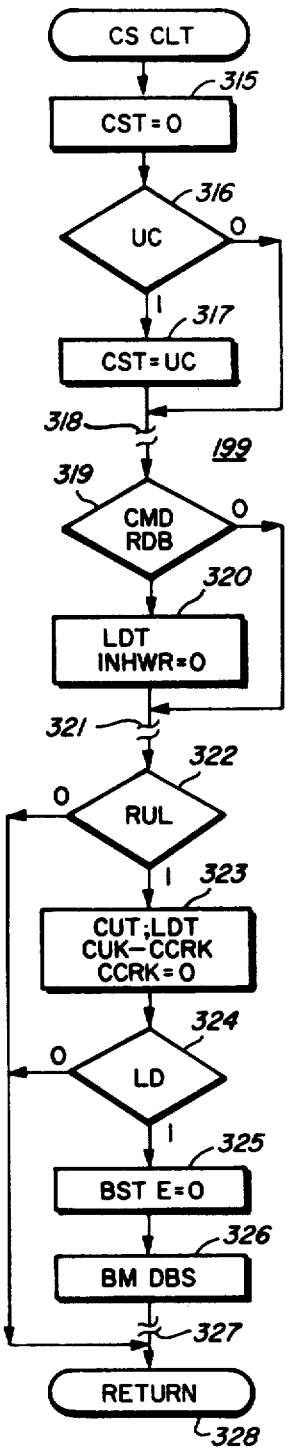
FIG. 24 is a logic diagram showing adjustment of load balancing delay tabulations upon deactivation or other removal of a device from load balance operation of a peripheral subsystem.

FIG. 24 illustrates logic module CS CLT 199 which in practicing the present invention relates to adjusting the CCRK and CUK when a device 13 is about to have a buffer segment deallocated. At 315 for deallocation microprocessor 110 operates on CST 131 for resetting many of the control fields of the entry indicated by DADDR 227. For example, command pending field P 244 is reset, CCR field 245 is reset and SDV 228 is reset. CE field 246 is conditionally reset depending upon the status of the storage subsystem 10 which is beyond the scope of the present description. In this activity if a UNIT CHECK or error condition was reported to host 12, then fields represented by ellipsis 247 are set to indicate to the control unit 11 that an error condition has been reported and that sense data relating to that error condition has to be preserved for a host 12. In this regard, at 316 microprocessor 110 checks for active UNIT CHECK conditions, and BST 137 entry relating to the logical device subject to deallocation in a UNIT CHECK field (being one of the fields represented by ellipsis 247). At 318, microprocessor 110 performs other CST 131 related controls not pertinent to an understanding of the present invention. At 319, microprocessor 110 determines whether or not the buffer 15 segment to be deallocated is being read by a host 12 in a READ BUFFER command, as indicated in CMD field 241. Execution of a READ BUFFER command transfers data to be written on a device 13 from buffer 15 to a host, rather than to the device 13. If it is a READ BUFFER command, then, in LDT 133, writing data from the buffer to the device 13 is inhibited by setting a field (not shown) as represented by ellipsis 256. At 321 additional non-pertinent logic steps are performed by microprocessor 110.

The following steps relate to practicing the present invention. At 322, microprocessor 110 determines whether the command in field CMD 241 is a rewind and unload (RUL) as would be the case when logic module CS CLT 199 was activated by logic module CE RUL 197. When RUL is the case at 323, microprocessor 110 adjusts the CUK and CCRK counts respectively in CUT 130 and LDT 133. This adjustment is achieved by subtracting the CCRK of LDT 133 corresponding to the device being subjected to the rewind from the CUK field 45 of CUT. At the same time CCRK of LDT 133 for the addressed device executing the RUL is reset to zero. This action adjusts the busy state indications of the CCR counts to the newly acquired status of storage subsystem 10 as a result of the rewind and unload command received from a host 12. At 324, microprocessor 110 determines whether or not the logical device still exists for the device 13 address with the RUL; that is, is the buffer 15 segment still allocated to the device 13 executing the rewind and unload command. If the logical device is still active, then at 325 microprocessor 110 accesses the BST 137 register for the addressed device 13 to reset the E field 264. At 326, microprocessor 110 activates BM DBS 190 for deallocating the buffer 15 segment previously allocated to this device 13. Remember, when E field 264 is zero, then the buffer 15 segment is subject to deallocation. At 327, upon completion of logic module BM DBS 190 execution, microprocessor 110 performs additional logic steps not pertinent to an understanding of the invention. At 328 a return to the activating logic module, which in FIG. 6 is CE RUL 197, is made from either 327, 324 or 322 as seen in FIG. 24.

While the invention has been particularly shown and described with reference to preferred embodiments thereof, it will be understood by those skilled in the art that various changes in form and details may be made therein without departing from the spirit and scope of the invention.

What is claimed is:

1. The machine-implemented method of balancing loads between a first unit and a second unit, the automatic machine executed steps of:

in each of said units separately measuring delays in current activity to be balanced for a plurality of respective work allocations and storing said measurements;

in each of said units summing and storing said measured delays for generating a measured stored total delay for each such unit, separately comparing all of the separately measured delays of each of said work allocations with a said total delays in the units, respectively, and for each of said units identifying a one of said work allocations as exhibiting a mean current activity for respective units; said means current activity being an activity which exhibits a separately measured delay having a middle value with respect to all of said separately measured delays in the respective unit;

in a first unit detecting and indicating when said stored total measurements in said first unit exceeds a predetermined threshold;

in response to said indicating, comparing the stored total delay measurement indicated in said first unit with the total stored delay measurement indicated in said second unit to obtain a difference signal, comparing said difference signal with a threshold difference signal, if said difference signal is less than said threshold difference signal, do nothing to balance loads; if said difference signal exceeds said threshold differece signal, then transfer said identified one work allocation of said first unit from said first unit to said second unit.

2. The machine-implemented method set forth in claim 1 further including the steps in each unit, during said separate comparison in each unit, of; of identifying a identifying a second work allocation exhibiting a minimal measured delay with respect to other work allocations, separately and independently indicating a work capacity in each of said units; and after each transfer of said one work allocation, comparing the number of work allocations of said second unit with said capacity indication, if said exceeds work allocations in said second unit exceed said capacity indication, transfer said second work allocation from said second unit to said first unit.

3. The machine-implemented method set forth in claim 1 wherein said first and second units are first and second control units, respectively, in a peripheral system connected to a host system and having a plurality of peripheral devices operable with either of said first or second control units and with data signal transfers proceeding through said control units with respect to said peripheral devices, said peripheral devices constituting said work allocations, respectively; and transferring said devices for operation with said units from said first control unit to said second control unit to achieve said work allocation transfer.

4. The machine-implemented method set forth in claim 3 wherein each control unit can supply delay-indicating signals to a connected host indicating that data signal transfers between such host and control unit must be delayed due to operational status of a given one of said devices, the method further including the automatic steps of:

in each control unit, for each device operatively associated with such control unit, tallying the number of said delay-indicating signals as device tallies for constituting said measured delays, and tallying the total number of said delay-indicating signals sent by such control unit for all of said devices operationally associated therewith as control unit tallies for representing said measured delays; and when the control unit tally of said first control unit exceeds a predetermined numerical threshold, subtracting the control unit tally of said second control unit from the control unit tally of said first control unit to create a difference tally corresponding to said difference signal.

5. The machine-implemented method set forth in claim 4 further including the automatic-machine steps of:

in said first control unit, dividing said difference tally by two to create a transfer tally, separately comparing all of said device tallies in said first control unit to said transfer tally, and selecting the device having a device tally closest to said transfer tally as a work allocation to be transferred from said first control unit to said second control unit.

6. The machine-implemented method set forth in claims 1 or 5 further including the automatic machine step of resetting all of said measured delays in both said first and second units whenever said stored total measurement in said first unit exceeds said predetermined threshold.

7. The machine-implemented method set forth in claims 1 or 5 wherein said first and second units each include a buffer memory having a first plurality of addressable registers, segments of said buffer memory including a second plurality less than said first plurality of said addressable registers, each such segment being allocatable to a one of said work allocations, further including the automatic machine steps of:

upon a transfer of said predetermined portion of said work allocations, deallocating a said segment in said first unit from said transferred work allocation and allocating a segment in said second unit to said transferred work allocation.

8. The machine-implemented method of balancing workloads between two parallel data processing paths, the automatic machine steps of:

segmenting the data processing in each path into work allocations;

separately tabulating undesired delays in data processing for each of said work allocations;

totaling said tabulations for each of said data processing paths;

independently comparing the total tabulations for each path with a first threshold of such undesired delay tabulations;

when one of said total tabulations for a given one of said data processing paths exceeds said first threshold, then determining the difference in the total delay tabulations between said paths; when the difference between the totals of delay tabulations exceeds a predetermined value, then transfer a one work allocation of said given one data processing path to a second data processing path; selecting said one work allocation to have an average number of all said separate undesired delay tabulations in the one data processing path with respect to said difference of said total delay tabulations; and each time said first threshold is exceeded in either one of said paths, recalibrating said separate and total tabulations for all of said data processing paths and without affecting said determining step and said selecting step.

9. A machine-implemented method of operating a data processing system having a plurality of independent, program controlled, data processors for regulating the flow of tasks to said data processors from a plurality of sources to facilitate the processing of the tasks with a minimal delay, comprising the automatic machine steps of:

assigning said tasks to said data processors, each task being assigned to but one data processor, monitoring and totaling, individually for each task and collectively for each data processor for each data processor, the number of time delay occurrences in each of said data processors resulting from tasks then being performed by them, the totaling of said time delays being substantially concurrent with the occurrence of the respective time delays;

selecting a separate upper limit value for a total number of task delay occurrence for each said data processor;

diverting a task having a mean number of occurrences of said task delay occurrences of all task delay occurrences in a one of said data processors and assigned to one of said data processors to another of said data processors upon a determination that the difference between task delay occurrence totals of said data processors exceeds a given difference limit value; and processing said diverted task in said another data processor.

10. The machine-implemented method set forth in claim 9 wherein said sources are input-output channels and said tasks include transferring data signals between said input-output channels and a plurality of peripheral devices and said data processors are control units interposed between said peripheral devices and said input-output channels and said step of diverting said coupled task includes disconnecting a peripheral device of said diverted coupled task and assigned to said one data processor and connecting it to said another data processor.

11. The machine-implemented method set forth in claim 9 or 10 further including the automatic machine steps in said another data processor after a one of said data processors has transferred a task to said another data processor, of:

establishing a return threshold and identifying a task therein as having a minimal number of time delay occurrences comparing a number of tasks assigned thereto with a said return threshold, and when said number of tasks exceeds said return threshold, diverting a task with said minimal number of task delay occurrences from said another data processor to said one data processor.

12. The machine-implemented method set forth in claims 9 or 10 further including the step of resetting all of said separate and total tabulations in all of said data processors each time any one of said collective total tabulations exceeds said upper limit value.

13. The machine-implemented method set forth in claim 12 wherein each of said assigned tasks includes multiple successive data operations, upon initiation of each data operation in any task in any of said data processors performing said monitoring and totaling step.

14. An automatic load-balancing data processing unit adapted to be connected to at least another data processing unit in a distributed processing network, a memory in each of said data processing units and each memory having allocatable segments for use with diverse data processing operations, the improvement comprising:

means in each of said data processing units for indicating data processing delays in any of said data processing operations associated with said segments;

a work delay counter for each segment in each of said data processing units and respectively coupled to said indicating means to respond to each indicated delay for the respective segments for tallying a number of said indicated data processing delays respectively associated with data processing operations using each such segment;

a total delay counter in each of said data processing units and coupled to said indicating means, respectively, for tallying all of said delay indications independent of which data processing operation is involved in such delay;

a first threshold detector in each of said data processing units and coupled to said total delay counter, respectively, for detecting and indicating when a count in said total delay counter exceeds a predetermined value; and transfer means in each of said data processing units and coupled to said work delay counters, respectively, in said data processing units, and responsive to said respective first threshold detector for separately comparing the number in each said work delay counters with the number in said total delay counter to indicate a one of said segments associated with a one of said data processing operations having a number of delays closest to a given mean number of delays with respect to all said number of work delays for said segments, in a respective one of said data processing units whereby such one data processing operation is indicated as eligible for transfer to said another data processing unit for initiating a load balancing operation between the two data processors.

15. The data processing unit set forth in claim 14 further including in combination:

message receiving means in a first given one of said data processing units for receiving, during a load balancing operation initiated by second given one of said data processing units connected to the first given one of said data processing units, identifications of data processing operations to be performed;

data processing operation capacity means in said first given one of said data processing units for analyzing all the data processing operations workload to be performed and having means for comparing said workload with a work threshold and to indicate when said work threshold is exceeded;

minimal work identifying means in said first given one of said data processing units responsive to said capacity means indication to identify a data processing operation exhibiting a minimal workload requirement and having means to actuate said transfer means to indicate another one of said segments associated with said identified minimal workload data processing operation as eligible for transfer to said another data processing unit; and said message receiving means being coupled to said second given one of said data processing units, said capacity means being coupled to said receiving means, said identifying means being coupled to said capacity means and to said transfer means.

16. The data processing units set forth in claims 14 or 15 further including, in combination:

a difference threshold detector in each of said data processing units and coupled to said total delay counter for receiving its total delay count;

means in each of said data processing units coupled to another of said data processing units for receiving from said another data processing unit an indication of its total delay count and for supplying the receiving indication to said difference threshold detector in such each data processing unit;

reset means in each of said data processing units responsive to said first threshold detector of such each data processing unit indication of a count exceeding said predetermined value to reset all said counts in such each data processing unit;

said difference threshold detector in each data processing unit being interposed between said first threshold detector and said transfer means of such each data processing unit such that said difference threshold detector thereof responds to said first threshold detector indication thereof, independently of said reset means, to compare the total delay counts of said another data processing unit and said total delay counter of the each data processing unit and to actuate said transfer means thereof to indicate a one of said segments having a mean value of the difference in said total counts.

17. The data processing units set forth in claim 16 wherein each of said data processing units is a control unit for coupling a host to a plurality of peripheral devices, the improvement further including, in combination:

device-access indicating means in each control unit for indicating accessibility of said peripheral devices;

said data processing delay indicating means in each control unit being coupled and responsive to said device-access indicating means indicating no immediate access to a given device to indicate to a host a data processing delay; and said allocatable segments in such each control unit being allocatable for exclusive use for respective ones of said peripheral devices such that said data processing operations are data transfers between said memory and said peripheral devices while said delays indicated to said host result from delays in said data transfers.

18. Data processing apparatus including a host processor system (12) connected to issue work instructions to a plurality of peripheral devices (13), each of said peripheral devices having an operational status and being allocatable for operation to either of two control units (11), each of which allocates work to its said allocated peripheral devices or stores such work, depending upon said operational status of the device concerned, and to initiate work transfer between control units each control unit including: means (41,42) to separately store the number of work delay occurrences for each of its said allocated peripheral devices means (45) to summate the the delay occurrences, means (46) to indicate when the summation of delay occurrences exceeds a threshold value, means (55), responsive to such indication, to compare the summation of delay occurrences in the two control units to obtain a difference, means (55) to compare such difference with a threshold difference value, means (58) responsive to initiation of work transfer to compare the separately stored number of work delay occurrences with said difference of summated delays and to select a one of said peripheral devices corresponding to a one of said stored number of work delay occurrences having a value closest of any of said stored numbers of work delay occurrences to a transfer value which is a predetermined proportion of said difference between the summated delay occurrences such that the transfer or non-transfer of any particular peripheral device depends on its own contribution to the overall work load of the pertinent control unit, and means (60), responsive to such difference exceeding the threshold difference value, to initiate transfer of said selected one peripheral device from a first one to a second one of said control units control unit.

19. Apparatus according to claim 18, in which each control unit is responsive to host processor commands to issue a signal (CCR) indicating a work delay occurrence, and tallying such signals in the current work delay store means (41,42).

20. Apparatus according to claim 19, in which each said control unit includes a memory (15) with segments (17) allocatable to said peripheral devices, and a separate counter for each of said segments in said summate means for tallying said separate work delay occurrences.

21. Apparatus according to claim 18, 19 or 20, including means to identify and select a work allocation involving a minimum number of delay occurrences for transfer said first one control unit.

22. Apparatus according to claim 21, in which the control-unit-receiving-work transfers other work to the control-unit-transferring-the-work when the summated delay occurrences of said control-unit-receiving-work exceeds the threshold value in the control-unit-receiving-work.

23. Apparatus according to claim 18, 19 or 20, including means (56) to halve the difference between the total delay occurrence counts in the control units, and in which the selection of work transferred is initially based on this halved value.

* * * * *